United States Patent
Takahashi et al.

(10) Patent No.: US 9,300,740 B2
(45) Date of Patent: *Mar. 29, 2016

(54) CONTENT DELIVERY SYSTEM WHERE IN A CONTENT MARKER INFORMATION REGISTERED BY ONE USER MAY BE VIEWED AND/OR REQUESTED BY A USER OTHER THAN A SPECIFIC USER

(71) Applicant: NEC CORPORATION, Tokyo (JP)

(72) Inventors: Eiji Takahashi, Tokyo (JP); Satoshi Nogaki, Tokyo (JP); Toru Osuga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/474,419

(22) Filed: Sep. 2, 2014

(65) Prior Publication Data

US 2014/0372520 A1 Dec. 18, 2014

Related U.S. Application Data

(63) Continuation of application No. 13/128,735, filed as application No. PCT/JP2009/006067 on Nov. 13, 2009, now Pat. No. 8,856,363.

(30) Foreign Application Priority Data

Nov. 18, 2008 (JP) .................................. 2008-294271

(51) Int. Cl.
*G06F 15/16* (2006.01)
*H04L 29/08* (2006.01)
(Continued)

(52) U.S. Cl.
CPC .......... *H04L 67/16* (2013.01); *G06F 17/30884* (2013.01); *G06F 21/10* (2013.01); *H04L 67/42* (2013.01); *H04N 21/47214* (2013.01)

(58) Field of Classification Search
CPC ................................ H04L 29/06; H04L 29/08
See application file for complete search history.

(56) References Cited

U.S. PATENT DOCUMENTS

2004/0049598 A1* 3/2004 Tucker et al. ................. 709/246
2005/0021817 A1* 1/2005 Shimizu et al. ............... 709/231
(Continued)

FOREIGN PATENT DOCUMENTS

EP 1973303 A1 9/2008
JP 2004173102 A 6/2004
(Continued)

OTHER PUBLICATIONS

Rui Fan et al: "Efficient replication of large data objects", DISC 2003, Oct. 3, 2003, XP055180304, Retrieved from the Internet: URL:http://hdl.handle.net/1721.1/29581 [retrieved on Mar. 31, 2015].

(Continued)

*Primary Examiner* — Hassan Kizou
*Assistant Examiner* — Abdelnabi Musa

(57) ABSTRACT

This system 1 accepts content marker information including content identifier information, and executes a process of causing a storing device to store the content marker information. The system accepts sharing-user identifier information for identifying a user/users who shares/share the stored content marker information. Upon acceptance of a content marker output request, the system transmits content marker information extracted based on the accepted sharing-user identifier information, to user equipment 2a, 2b. Upon acceptance of the content transmission request based on the content marker information, the system determines whether to transmit content data to the user equipment based on stored viewing permission information.

15 Claims, 22 Drawing Sheets

(51) Int. Cl.
*G06F 21/10* (2013.01)
*H04N 21/472* (2011.01)
*H04L 29/06* (2006.01)
*G06F 17/30* (2006.01)

(56) References Cited

U.S. PATENT DOCUMENTS

2008/0168073 A1 7/2008 Siegel et al.
2008/0172291 A1* 7/2008 Hurowitz et al. ............... 705/14
2008/0256216 A1* 10/2008 Aarts ............................ 709/217
2008/0307108 A1* 12/2008 Yan et al. ..................... 709/231
2009/0144811 A1* 6/2009 Matsubara et al. ............... 726/5

FOREIGN PATENT DOCUMENTS

| JP | 2007102780 A | 4/2007 |
| JP | 2008117374 A | 5/2008 |
| JP | 2008158663 A | 7/2008 |

OTHER PUBLICATIONS

EESR for EP Application No. 09827321.2 mailed on Apr. 16, 2015 with English Translation.
International Search Report for PCT/JP2009/006067 mailed Dec. 15, 2009.

* cited by examiner

Fig.19

LIST OF CONTENT MARKER INFORMATION

| CONTENT MARKER 1 |
| CONTENT MARKER 2 NOT VIEWABLE |
| CONTENT MARKER 3 |
| CONTENT MARKER 4 |

Fig.20

LIST OF CONTENT MARKER INFORMATION

| CONTENT MARKER 1 |
| CONTENT MARKER 2 VIEWABLE BY PLAN B |
| CONTENT MARKER 3 |
| CONTENT MARKER 4 |

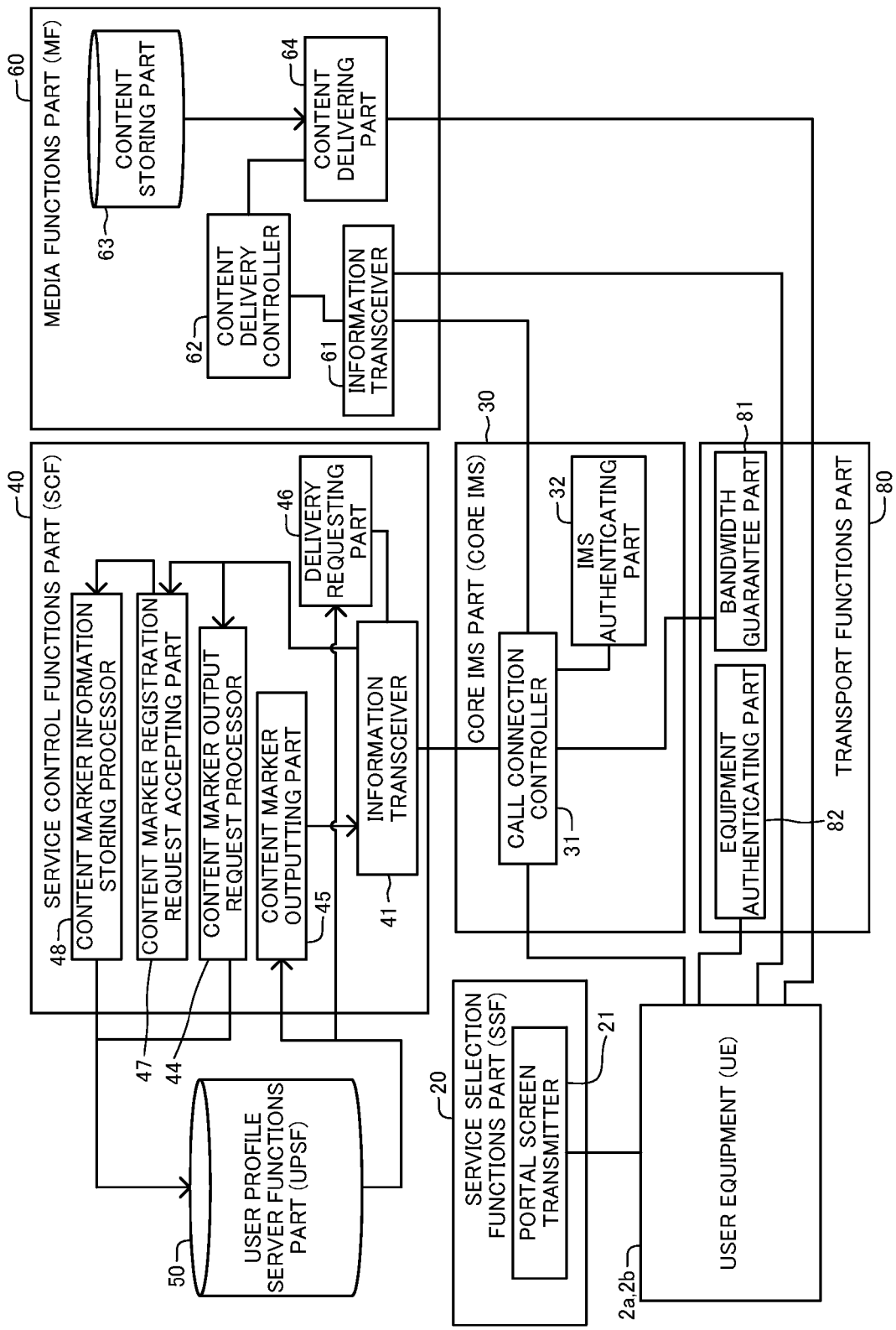

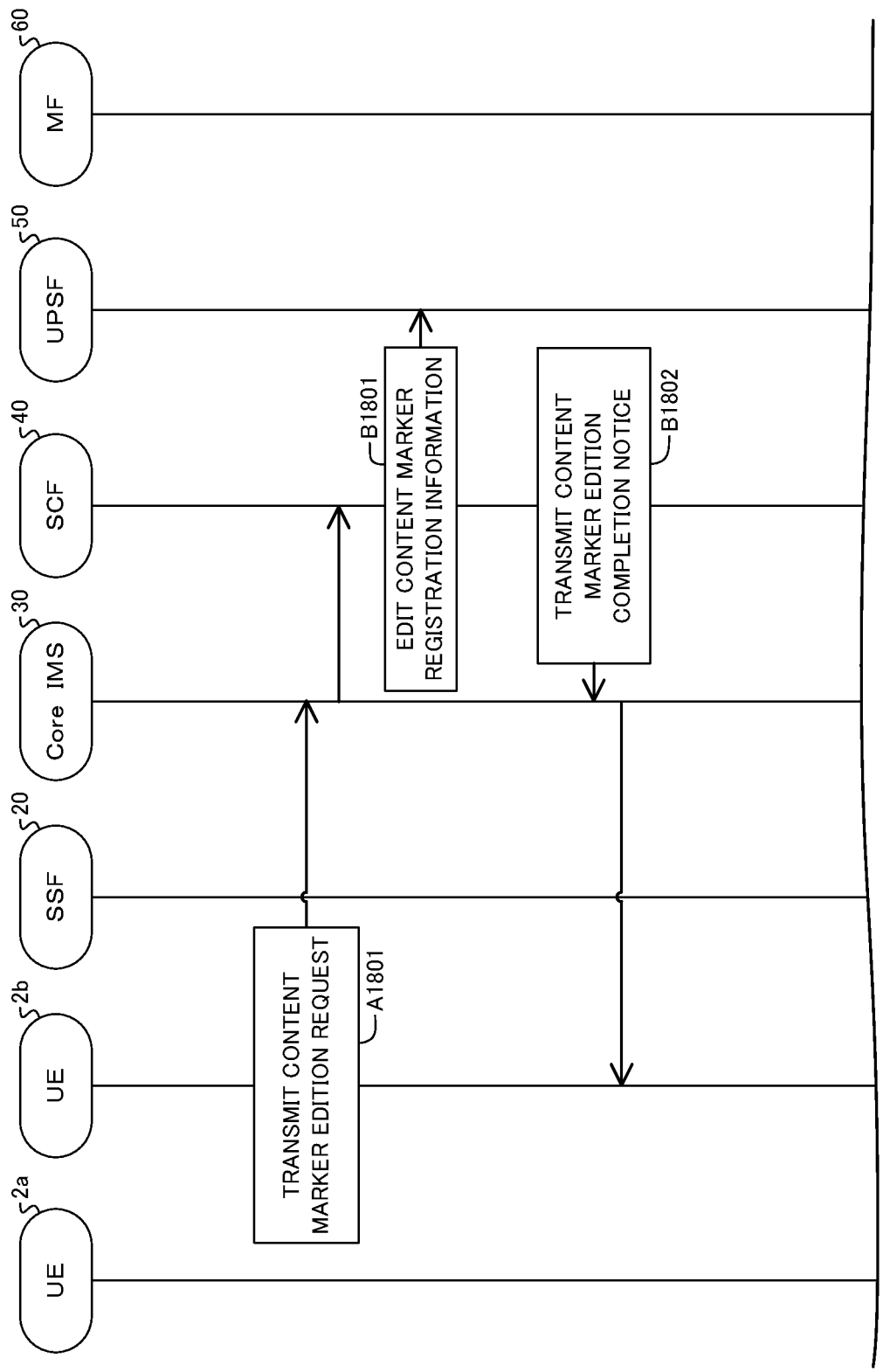

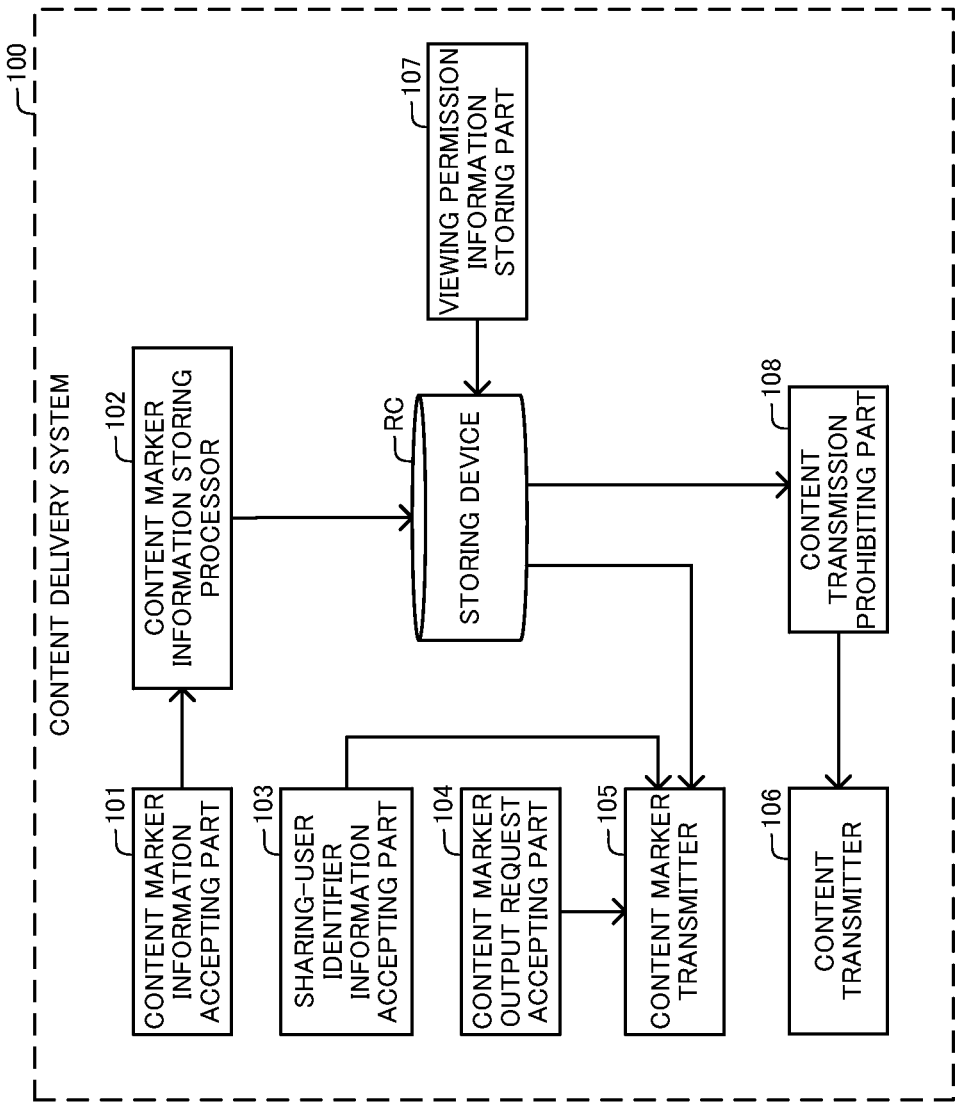

CONTENT DELIVERY SYSTEM WHERE IN A CONTENT MARKER INFORMATION REGISTERED BY ONE USER MAY BE VIEWED AND/OR REQUESTED BY A USER OTHER THAN A SPECIFIC USER

CROSS-REFERENCE TO RELATED APPLICATIONS

The present application is a Continuation application of Ser. No. 13/128,735 filed on May 11, 2011, which is a National Stage Entry of International Application PCT/JP2009/006067, filed on Nov. 13, 2009, which claims the benefit of priority from Japanese Patent Application 2008-294271 filed on Nov. 18, 2008, the disclosures of all of which are incorporated in their entirety by reference herein.

TECHNICAL FIELD

The present invention relates to a content delivery system that transmits content data representing content to user equipment.

BACKGROUND ART

A content delivery system that transmits content data representing content to user equipment is known. A system described in Patent Document 1 as one of this type of content delivery systems accepts content marker information transmitted by user equipment. Content marker information includes content identifier information for identifying content.

Then, the content delivery system stores the accepted content marker information. After that, in response to a content marker output request transmitted by the user equipment, the content delivery system transmits the stored content marker information to the user equipment.

On the other hand, upon reception of the content marker information, the user equipment prompts the user to select one of the received content marker information. Then, the user equipment transmits a content transmission request including content identifier information included in the content marker information selected by the user to the content delivery system.

Upon reception of the content transmission request transmitted by the user equipment, the content delivery system transmits content data identified by the content transmission request to the user equipment. Consequently, without performing a cumbersome operation in order to specify content that the user of the user equipment wants to view, the user can view the content.

[Patent Document 1] Japanese Unexamined Patent Application Publication No. JP-A 2004-173102

The content delivery system described above is configured to transmit the stored content marker information to user equipment in response to a content marker output request by any user. Therefore, the content delivery system has a problem that, even if one user wants only a specific user to view registered content marker information, a user other than the specific user may view the content marker information.

Further, the content delivery system described above is configured to transmit content data to user equipment in response to a content transmission request by any user. Therefore, the content delivery system also has a problem that content requested based on content marker information may be viewed by a user other than the specific user.

SUMMARY

Accordingly, an object of the present invention is to provide a content delivery system capable of solving the aforementioned problems, "content marker information registered by one user may be viewed by a user other than a specific user" and "content requested based on content marker information may be viewed by a user other than a specific user."

In order to achieve the object, a content delivery system of an exemplary embodiment of the present invention includes:

a content marker information accepting means configured to accept content marker information including content identifier information for identifying content;

a content marker information storing processing means configured to execute a process of causing a storing device to store the accepted content marker information;

a sharing-user identifier information accepting means configured to accept sharing-user identifier information for identifying a user/users who shares/share the stored content marker information;

a content marker output request accepting means configured to receive a content marker output request that is transmitted by user equipment, that includes user identifier information for identifying a user and that is a request for an output of the content marker information, thereby accepting the content marker output request;

a content marker transmitting means configured to, based on the user identifier information included in the accepted content marker output request and the accepted sharing-user identifier information, extract content marker information corresponding to the user identifier information from the stored content marker information, and transmit the extracted content marker information to the user equipment having transmitted the content marker output request;

a content transmitting means configured to, in the case of receiving the content transmission request that is transmitted by the user equipment and that includes the content identifier information included in the content marker information and the user identifier information for identifying the user of the user equipment, transmit content data representing content identified by the content identifier information to the user equipment;

a viewing permission information storing means configured to store the user identifier information, the content identifier information and viewing permission information representing whether to permit transmission of the content data to the user equipment in association with one another; and a content transmission prohibiting means configured to, in a case that the viewing permission information stored in association with the user identifier information and the content identifier information that are included in the content transmission request represents non-permission of transmission of the content data to the user equipment, prohibit transmission of the content data by the content transmitting means.

Further, a content delivery system of another exemplary embodiment of the present invention includes an application server system and a connection control system.

The connection control system includes a Core IMS (Internet Protocol Multimedia Subsystem) part configured to receive equipment specification information transmitted by user equipment and establish a connection between the application server system and the user equipment based on the received equipment specification information.

The application server system includes: a media functions part configured to transmit content data representing content to the user equipment with the connection established by the connection control system; a service control functions part configured to control a service provided by the media functions part; and a user profile server functions part configured to store profile information of a user of the user equipment.

The application server system further includes: a content marker information accepting means configured to receive content marker information, which is information transmitted by the user equipment and which is information including content identifier information for identifying content, via the Core IMS part, thereby accepting the content marker information; a content marker information storing processing means configured to execute a process of causing the user profile server functions part or the service control functions part to store the accepted content marker information; a sharing-user identifier information accepting means configured to receive sharing-user identifier information, which is information transmitted by the user equipment and which is information for identifying a user/users who shares/share the stored content marker information, via the Core IMS part, thereby accepting the sharing-user identifier information; a content marker output request accepting means configured to receive a content marker output request, which is information transmitted by the user equipment and which is information including user identifier information for identifying a user and requesting for an output of content marker information, via the Core IMS part, thereby accepting the content marker output request; a content marker transmitting means configured to, based on the user identifier information included in the accepted content marker output request and the accepted sharing-user identifier information, extract content marker information corresponding to the user identifier information from the stored content marker information, and transmit the extracted content marker information to the user equipment having transmitted the content marker output request via the Core IMS part; a content transmitting means configured to, in the case of receiving a content transmission request, which is transmitted by the user equipment and which includes the content identifier information included in the content marker information and user identifier information for identifying a user of the user equipment, transmit content data representing content identified by the content identifier information to the user equipment; a viewing permission information storing means configured to store the user identifier information, the content identifier information and viewing permission information representing whether to permit transmission of the content data to the user equipment in association with one another; and a content transmission prohibiting means configured to, in a case that the viewing permission information stored in association with the user identifier information and the content identifier information that are included in the content transmission request represents non-permission of transmission of the content data to the user equipment, prohibit transmission of the content data by the content transmitting means.

Further, a content delivery method of another exemplary embodiment of the present invention is a content delivery method including:

accepting content marker information including content identifier information for identifying content;

executing a process of causing a storing device to store the accepted content marker information;

accepting sharing-user identifier information for identifying a user/users who shares/share the stored content marker information;

receiving a content marker output request, which is transmitted by user equipment, which includes user identifier information for identifying a user and which is a request for an output of content marker information, thereby accepting the content marker output request;

based on the user identifier information included in the accepted content marker output request and the accepted sharing-user identifier information, extracting content marker information corresponding to the user identifier information from the stored content marker information, and transmitting the extracted content marker information to the user equipment having transmitted the content marker output request;

in the case of receiving a content transmission request, which is transmitted by the user equipment and which includes the content identifier information included in the content marker information and user identifier information for identifying the user of the user equipment, transmitting content data representing content identified by the content identifier information to the user equipment;

causing the storing device to store the user identifier information, the content identifier information and viewing permission information representing whether to permit transmission of the content data to the user equipment in association with one another; and at the time of transmission of the content data to the user equipment, in a case that the viewing permission information stored in association with the user identifier information and the content identifier information that are included in the content transmission request represents non-permission of transmission of the content data to the user equipment, not transmitting the content data.

Further, an application server system of another exemplary embodiment of the present invention includes:

a content marker information accepting means configured to accept content marker information including content identifier information for identifying content;

a content marker information storing processing means configured to execute a process of causing a storing device to store the accepted content marker information;

a sharing-user identifier information accepting means configured to accept sharing-user identifier information for identifying a user/users who shares/share the stored content marker information;

a content marker output request accepting means configured to receive a content marker output request, which is transmitted by user equipment, which includes user identifier information for identifying a user and which is a request for an output of the content marker information, thereby accepting the content marker output request;

a content marker transmitting means configured to, based on the user identifier information included in the accepted content marker output request and the accepted sharing-user identifier information, extract content marker information corresponding to the user identifier information from the stored content marker information, and transmit the extracted content marker information to the user equipment having transmitted the content marker output request;

a content transmitting means configured to, in the case of receiving a content transmission request that is transmitted by the user equipment and that includes the content identifier information included in the content marker information and the user identifier information for identifying the user of the user equipment, transmit content data representing content identified by the content identifier information to the user equipment;

a viewing permission information storing means configured to store the user identifier information, the content identifier information and viewing permission information representing whether to permit transmission of the content data to the user equipment in association with one another; and a content transmission prohibiting means configured to, in a case that the viewing permission information stored in association with the user identifier information and the content identifier information that are included in the content transmission request represents non-permission of transmission of the content data to the user equipment, prohibit transmission of the content data by the content transmitting means.

Further, a computer program of another exemplary embodiment of the present invention is a computer program for causing an application server system to realize:

a content marker information accepting means configured to accept content marker information including content identifier information for identifying content;

a content marker information storing processing means configured to execute a process of causing a storing device to store the accepted content marker information;

a sharing-user identifier information accepting means configured to accept sharing-user identifier information for identifying a user/users who shares/share the stored content marker information;

a content marker output request accepting means configured to receive a content marker output request, which is transmitted by user equipment, which includes user identifier information for identifying a user and which is a request for an output of the content marker information, thereby accepting the content marker output request;

a content marker transmitting means configured to, based on the user identifier information included in the accepted content marker output request and the accepted sharing-user identifier information, extract content marker information corresponding to the user identifier information from the stored content marker information, and transmit the extracted content marker information to the user equipment having transmitted the content marker output request;

a content transmitting means configured to, in the case of receiving a content transmission request that is transmitted by the user equipment and that includes the content identifier information included in the content marker information and the user identifier information for identifying the user of the user equipment, transmit content data representing content identified by the content identifier information to the user equipment;

a viewing permission information storing processing means configured to cause the storing device to store the user identifier information, the content identifier information and viewing permission information representing whether to permit transmission of the content data to the user equipment in association with one another; and a content transmission prohibiting means configured to, in a case that the viewing permission information stored in association with the user identifier information and the content identifier information that are included in the content transmission request represents non-permission of transmission of the content data to the user equipment, prohibit transmission of the content data by the content transmitting means.

Further, user equipment of another exemplary embodiment of the present invention comprises:

a content marker information transmitting means configured to transmit content marker information including content identifier information for identifying content;

a sharing-user identifier information transmitting means configured to transmit sharing-user identifier information for identifying a user/users who shares/share the content marker information;

a content marker output request transmitting means configured to transmit a content marker output request that includes user identifier information for identifying a user and that is a request for an output of content marker information;

a content marker list outputting means configured to receive the content marker information and output the received content marker information;

a content marker specification information accepting means configured to, from among the outputted content marker information, accept content marker specification information for specifying content marker information selected by the user;

a content transmission request transmitting means configured to transmit a content transmission request including content identifier information included in content marker information specified by the accepted content marker specification information; and a content outputting means configured to receive content data and output content represented by the received content data.

Further, a computer program of another exemplary embodiment of the present invention is a computer program for causing user equipment to realize:

a content marker information transmitting means configured to transmit content marker information including content identifier information for identifying content;

a sharing-user identifier information transmitting means configured to transmit sharing-user identifier information for identifying a user/users who shares/share the content marker information;

a content marker output request transmitting means configured to transmit a content marker output request that includes user identifier information for identifying a user of the user equipment and that is a request for an output of content marker information;

a content marker list outputting means configured to receive the content marker information and output the received content marker information;

a content marker specification information accepting means configured to, from among the outputted content marker information, accept content marker specification information for specifying content marker information selected by the user;

a content transmission request transmitting means configured to transmit a content transmission request including content identifier information included in content marker information specified by the accepted content marker specification information; and a content outputting means configured to receive content data and output content represented by the received content data.

With the configurations as described above, the present invention can allow only a specific user to view content marker information registered by one user, and can also allow only a specific user to view content requested based on content marker information.

BRIEF DESCRIPTION OF DRAWINGS

FIG. 19 is a view showing an image outputted by user equipment according to a modified example 6 of the first exemplary embodiment and representing a list of content marker information;

FIG. 20 is a view showing an image outputted by user equipment according to a modified example 7 of the first exemplary embodiment and representing a list of content marker information;

FIG. 21 is a block diagram schematically showing a function of a content delivery system according to a second exemplary embodiment;

FIG. 22 is a sequence diagram showing an operation of the content delivery system according to the second exemplary embodiment when changing a user/users who shares/share content marker information in response to an input by the user of the user equipment; and FIG. 23 is a block diagram schematically showing a function of a content delivery system according to a fourth exemplary embodiment of the present invention.

EXEMPLARY EMBODIMENT

Below, the respective exemplary embodiments of a content delivery system, a content delivery method, an application server system, user equipment and a computer program according to the present invention will be described with reference to FIGS. 1 to 23.

First Exemplary Embodiment (Configuration)

Figure 1:
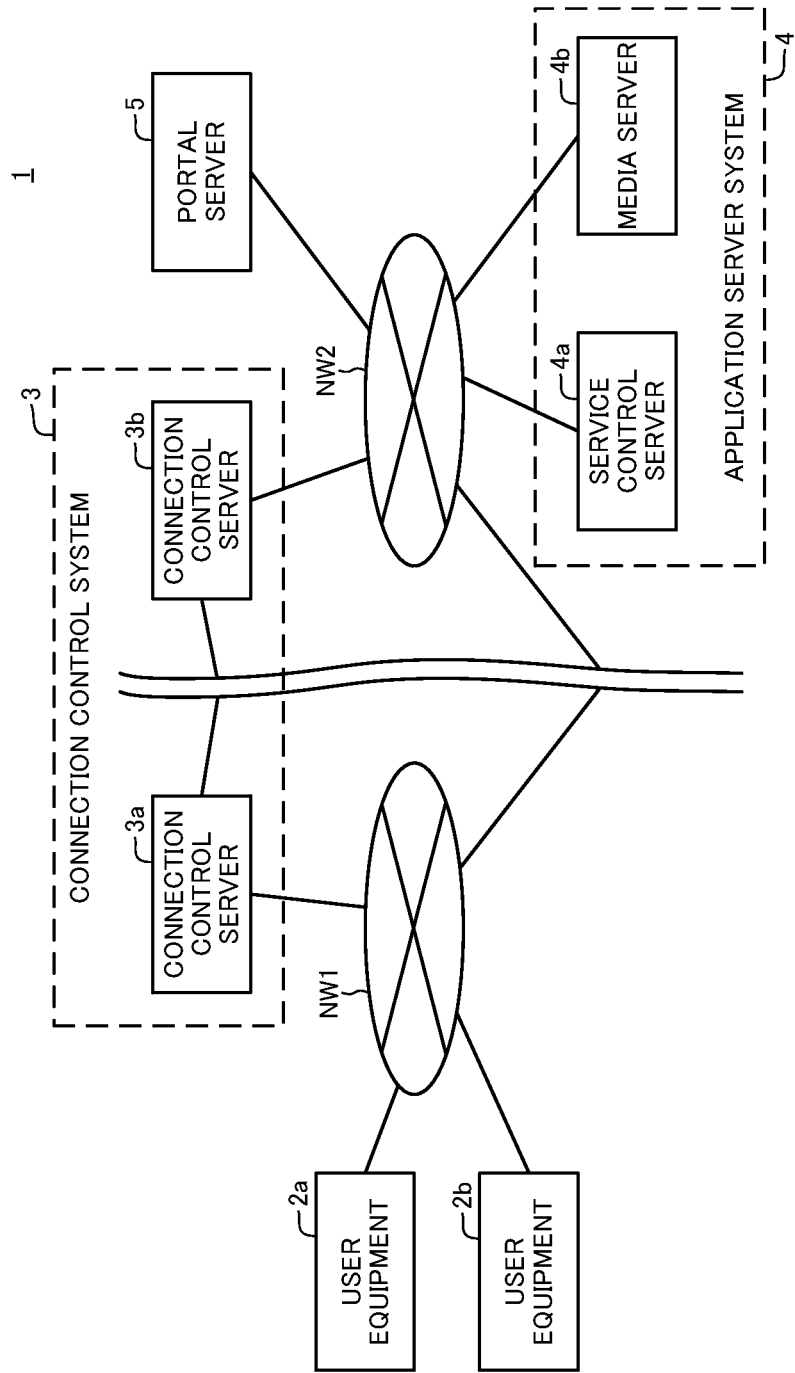
FIG. 1 is a diagram showing a schematic configuration of a content delivery system according to a first exemplary embodiment of the present invention.

As shown in FIG. 1, a content delivery system 1 according to a first exemplary embodiment is a VoD (Video-on-Demand) system. The content delivery system 1 may be an IPTV (Internet Protocol Television) system other than the VoD system, such as a BC (BroadCast) system that broadcasts content or an nPVR (network Personal Video Recorder) system that performs unicast delivery of previously recorded broadcast content.

The content delivery system 1 includes a connection control system 3, an application server system 4, and a portal server 5. The connection control system 3 includes a plurality of servers including a connection control server 3a and a connection control server 3b. The application server system 4 includes a plurality of servers including a service control server 4a and a media server 4b.

The connection control server 3a is connected with user equipment (UE) 2a and 2b so as to be capable of communicating via a user-side communication line NW1 configuring an IP (Internet Protocol) network. The connection control server 3b, the application server system 4 and the portal server 5 are connected so as to be capable of communicating with one another via a service-provider-side communication line NW2 configuring the abovementioned IP network.

The user equipment 2a is provided with a set top box and a remote controller, which are not shown in the drawings. The set top box is connected to a television, which is not shown in the drawings. The set top box receives content data representing content (a moving image composed of sounds and images in this exemplary embodiment) transmitted by the media server 4b, and converts the received content data to cause the television to output the content.

The remote controller is provided with a plurality of buttons (button-type switches). When the buttons are pressed by a user, the remote controller transmits infrared signals corresponding to the buttons to the set top box. The set top box receives the infrared signals from the remote controller to accept information inputted by the user.

Further, in the user equipment 2a, equipment specification information as information for specifying the equipment (the equipment itself) is stored in a memory serving as a storing device.

The user equipment 2b has the same configuration and function as the user equipment 2a.

The connection control server 3a, the connection control server 3b, the service control server 4a, the media server 4b and the portal server 5 (i.e., the servers 3a to 5) are each provided with a central processing unit (CPU) and a storing device (a memory and a hard disk drive (HDD)) that are not shown in the drawings. Each of the servers 3a to 5 is configured to realize a function described later by execution of a program stored in the storing device by the CPU.

The connection control server 3a and the connection control server 3b are each configured to transmit and receive SIP messages (messages according to SIP (Session Initiation Protocol)) to control a connection among a plurality of devices. That is to say, the connection control server 3a and the connection control server 3b are SIP servers.

The connection control system 3 is configured to, when receiving an SIP message including equipment specification information transmitted by the user equipment 2a (or the user equipment 2b), establish a connection (a session) between the application server system 4 and the user equipment 2a (or the user equipment 2b) based on the equipment specification information included in the received SIP message.

The service control server 4a controls a service (a service of transmitting content data) provided by the media server 4b. The media server 4b transmits content data representing content to the user equipment 2a (or the user equipment 2b) connected by the connection control system 3.

The portal server 5 is configured to transmit and receive messages according to HTTP (Hypertext Transfer Protocol) (HTTP message) to transmit and receive data to and from the user equipment 2a (or the user equipment 2b). That is to say, the portal server 5 is a web server.

(Function)

Figure 2:
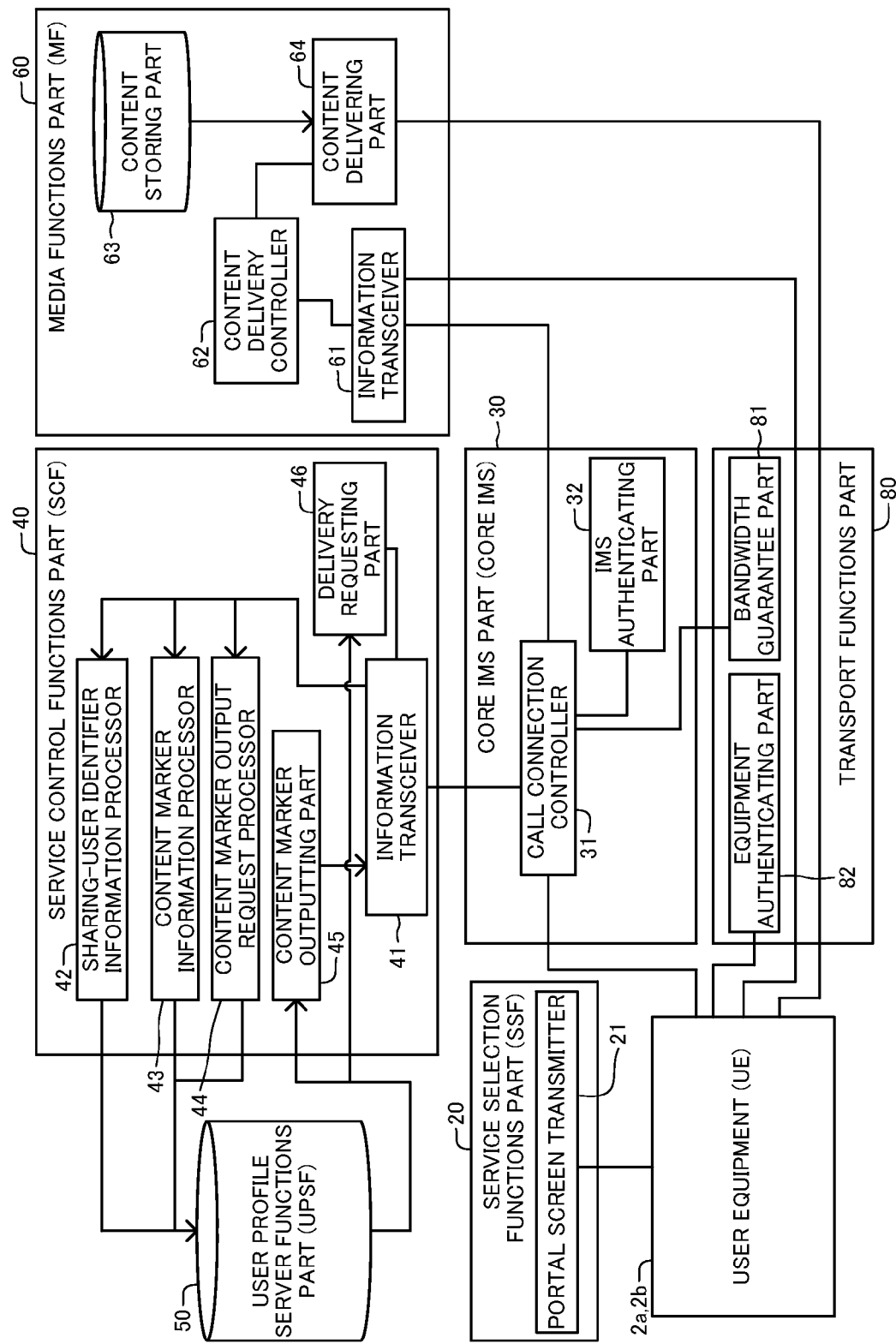
FIG. 2 is a block diagram schematically showing a function of the content delivery system shown in FIG. 1.

FIG. 2 is a block diagram showing a function of the content delivery system 1 configured as described above. Moreover, FIG. 3 is a block diagram showing a function of the user equipment 2a configured as described above.

(Function: User Equipment)

Figure 3:
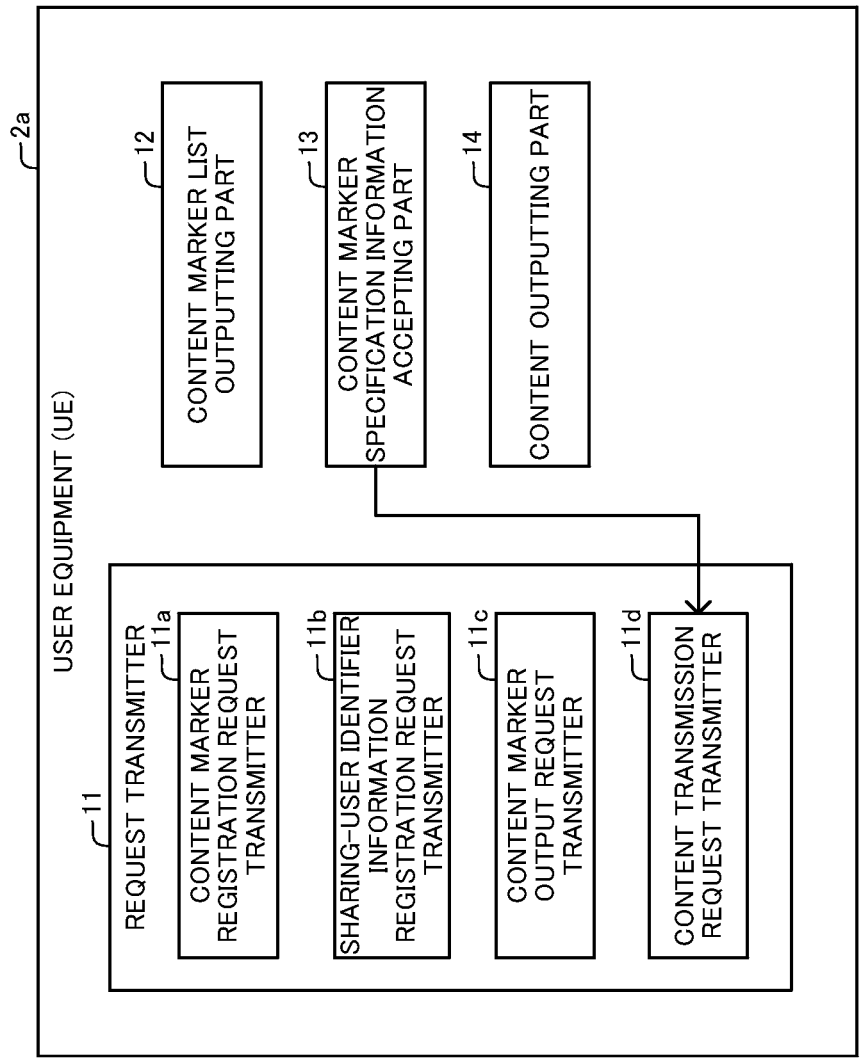
FIG. 3 is a block diagram schematically showing a function of user equipment shown in FIG. 1.

As shown in FIG. 3, the function of the user equipment 2a includes a request transmitter 11, a content marker list outputting part (a content marker list outputting means) 12, a content marker specification information accepting part (a content marker specification information accepting means) 13, and a content outputting part (a content outputting means) 14.

When a power switch of the user equipment 2a is turned on (electric power is supplied), the request transmitter 11 transmits an SIP message as an equipment authenticating process request including stored equipment specification information, to the connection control server 3a.

Further, the request transmitter 11 receives an SIP message including equipment authentication success information from the connection control system 3. Equipment authentication success information is information that includes equipment address information representing a position on the IP network and represents the user equipment 2a in the position represented by the equipment address information is authenticated as valid equipment.

Furthermore, the request transmitter 11 transmits an SIP message including user authenticating information inputted by the user of the user equipment 2 via the remote controller, as a user authenticating process request, to the connection control system 3. In this exemplary embodiment, user authenticating information is composed of user identifier information representing a text for identifying the user of the user equipment 2, and password information representing a text as a password.

Further, the request transmitter 11 receives an SIP message including user authentication success information from the connection control system 3. User authentication success information is information including user identifier information and representing that the user identified with the user identifier information (i.e., the user having inputted user authenticating information) is authenticated as a valid user.

In the case of receiving user authentication success information from the connection control system 3, the request transmitter 11 transmits an SIP message including a process request of requesting the application server system to execute the process, to the connection control system 3 in response to a request transmission instruction inputted by the user of the user equipment 2. The process request includes the user authentication success information (i.e., the user identifier information).

To be specific, the request transmitter 11 includes a content marker registration request transmitter (a content marker information transmitting means) 11a, a sharing-user identifier information registration request transmitter (a sharing-user identifier information transmitting means) 11b, a content marker output request transmitter (a content marker output request transmitting means) 11c, and a content transmission request transmitter (a content transmission request transmitting means) 11d.

The content marker registration request transmitter 11a transmits a content marker registration request described later as a process request. The sharing-user identifier information registration request transmitter 11b transmits a sharing-user identifier information registration request described later as a process request. The content marker output request transmitter 11c transmits a content marker output request described later as a process request. The content transmission request transmitter 11d transmits a content transmission request described later as a process request.

The content marker list outputting part 12 receives content marker information, and viewing permission information representing whether to permit transmission of content data to the user equipment 2a. The content marker list outputting part 12 outputs a list of the received content marker information.

At this moment, the content marker list outputting part 12 outputs an image that shows, among the received content marker information, content marker information (viewable content marker information) associated with viewing permission information representing permission of transmission of content data to the user equipment 2a in bold letters. On the other hand, the content marker list outputting part 12 outputs an image that shows, among the received content marker information, content marker information (not-viewable content marker information) associated with viewing permission information representing non-permission of transmission of content data to the user equipment 2a in light letters.

That is to say, the content marker list outputting part 12 outputs viewable content marker information in a first mode, whereas outputs not-viewable content marker information in a second mode.

The content marker specification information accepting part 13 accepts content marker specification information for specifying content marker information selected by the user of the user equipment 2a from the content marker information list outputted by the content marker list outputting part 12.

The content transmission request transmitter 11d transmits a content transmission request including content identifier information included in content marker information specified by the content marker specification information accepted by the content marker specification information accepting part 13. Content identifier information is information for specifying content.

The content outputting part 14 receives content data and outputs content represented by the received content data (in this exemplary embodiment, causes a television to output).

(Function: Connection Control System)

A function of the connection control system 3 includes a Core IMS (Internet Protocol Multimedia Subsystem) part 30 and a transport functions (TF) part 80.

The Core IMS part 30 includes a call connection controller 31 and an IMS authenticating part (a user authenticating means) 32. Moreover, the transport functions part 80 includes a bandwidth guarantee part 81 and an equipment authenticating part 82.

The call connection controller 31 transmits and receives SIP messages to control a connection among a plurality of devices.

Further, when the connection control server 3a receives an equipment authenticating process request from the user equipment 2a, 2b, the equipment authenticating part 82 determines whether or not the equipment specification information included in the received equipment authenticating process request corresponds to (in this exemplary embodiment, coincides with) equipment authenticating criterion information, thereby determining whether the user equipment 2a, 2b is valid equipment or not (executing an equipment authenticating process). Here, equipment authenticating criterion information is information previously stored in a storing device of the connection control server 3a. Equipment authenticating criterion information may be stored in a storing device (a user profile file server functions part 50 described later) of the service control server 4a.

In a case that the user equipment 2a, 2b is authenticated as valid equipment, the equipment authenticating part 82 transmits an SIP message including equipment authentication success information to the user equipment 2a, 2b.

Further, in a case that the user equipment 2a, 2b is authenticated as valid equipment by the equipment authenticating part 82, the call connection controller 31 executes a process (e.g., a process of transferring a message to the application server system 4) based on a message (a process request, etc.) transmitted by the user equipment 2a, 2b.

On the other hand, in a case that the equipment authenticating part 82 does not authenticate the user equipment 2a, 2b as valid equipment, the call connection controller 31 does not thereafter execute a process based on a message (a process request, etc.) transmitted by the user equipment 2a, 2b.

Furthermore, when the connection control server 3a receives a user authenticating process request from the user equipment 2a, 2b, the IMS authenticating part 32 determines whether or not user authenticating information included in the received user authenticating process request corresponds to the user authenticating criterion information, thereby determining whether or not a user having inputted the user authenticating information (a user identified with user identifier information included in the user authenticating information) is a valid user (whether or not a user identified with the user identifier information coincides with the user of the user equipment 2a, 2b) (executing a user authenticating process). Here, user authenticating criterion information is information previously stored in the storing device (the user profile server functions part 50 described later) of the service control server 4a. That is to say, the user profile server functions part 50 configures a user authenticating criterion information storing means.

Then, in a case that the IMS authenticating part 32 authenticates the user having inputted the user authenticating information as a valid user, the call connection controller 31 transmits an SIP message including user authentication success information to the user equipment 2a, 2b. On the other hand, in a case that the IMS authenticating part 32 does not authenticate the user having inputted the user authenticating information as a valid user, the call connection controller 31 does not transmit an SIP message including user authentication success information to the user equipment 2a, 2b.

Furthermore, in the case of receiving a bandwidth guarantee instruction from the service control server 4a, the call connection controller 31 establishes a connection between the media server 4b and the user equipment 2a, 2b. A bandwidth guarantee instruction includes media delivery specification information for specifying the media server 4b, and communication bandwidth information representing a communication bandwidth. The call connection controller 31 transmits the received communication bandwidth information, and communication path specification information that specifies a communication path between the media server 4b specified by the received media delivery specification information and the user equipment 2a, 2b, to the transport functions part 80.

The bandwidth guarantee part 81 receives the communication bandwidth information and the communication path specification information from the call connection controller 31, and executes a process (a bandwidth guaranteeing process) for guaranteeing a communication bandwidth represented by the received communication bandwidth information, in the communication path specified with the received communication path specification information.

(Function: Service Control Server)

On the other hand, the function of the service control server 4a includes a service control functions part (SCF) 40 and a user profile server functions part (UPSF) 50.

The user profile server functions part 50 stores profile information of the users of the user equipment 2a and 2b. To be specific, the user profile server functions part 50 stores a content marker table, a sharing-user table and a viewing authority table in association with user identifier information.

The content marker table, the sharing-user table and/or the viewing authority table may be stored in the service control functions part 40. Moreover, the content marker table, the sharing-user table and/or the viewing authority table may be stored in another storing device that can be read and written by the service control functions part 40.

The content marker table is a table including a plurality of content marker registration information. Content marker registration information is composed of content marker information and content marker identifier information for identifying the content marker information in pairs. Content marker information includes content identifier information for identifying content, a playing start position representing a position to start playing the content, and a playing finish position representing a position to finish playing the content.

Further, the sharing-user table is a table including sharing-user (authorized-user, or authorized-view-user) identifier information for identifying a user/users who shares/share the content marker information stored in the user profile server functions part 50. The sharing-user table may include one piece of sharing-user identifier information, or may include a plurality of sharing-user identifier information. In a case that the sharing-user table does not include sharing-user identifier information (includes only empty information), it is represented that there is no user that shares the content marker information.

Further, the viewing authority table is a table including a plurality of viewing authority information. Viewing authority information is composed of a pair of content identifier information and viewing permission information. Viewing permission information is information representing whether to permit transmission of content data to the user equipment 2a, 2b. That is to say, the user profile server functions part 50 configures a viewing permission information storing means and a viewing permission information storing processing means. Moreover, a step of storing the viewing authority table by the user profile server functions part 50 is also referred to as a viewing permission information storing processing step.

Further, the service control functions part 40 includes an information transceiver (part of a content marker transmitting means) 41, a sharing-user identifier information processor (a sharing-user identifier information accepting means and a sharing-user identifier information storing processing means) 42, a content marker information processor (a content marker information accepting means and a content marker information storing processing means) 43, a content marker output request processor (a content marker output request accepting means) 44, a content marker outputting part (part of a content marker transmitting means) 45, and a delivery requesting part 46 (part of a content transmitting means, and a content transmission prohibiting means).

The information transceiver 41 receives a variety of information (requests, instructions, notices, etc.) transmitted by the user equipment 2a, 2b or the media server 4b via the Core IMS part 30 (through the Core IMS part 30). Moreover, the information transceiver 41 transmits a variety of information to the user equipment 2a, 2b or the media server 4b via the Core IMS part 30. In this exemplary embodiment, a variety of information is included in an SIP message.

Only when receiving a process request including user authentication success information from the user equipment 2a, 2b, the service control server 4a executes a process based on the process request. That is to say, in a case that the IMS authenticating part 32 authenticates a user having inputted user authenticating information as a valid user, the application server system 4 executes the process based on the process request.

The sharing-user identifier information processor 42 accepts a sharing-user identifier information registration request as a process request received by the information transceiver 41. A sharing-user identifier information registration request includes sharing-user identifier information, and user identifier information for identifying the user of the user equipment 2a, 2b. Then, the sharing-user identifier information processor 42 updates the sharing-user table stored by the user profile server functions part 50, based on the accepted sharing-user identifier information registration request.

To be specific, the sharing-user identifier information processor 42 adds sharing-user identifier information included in the received sharing-user identifier information registration request, to the sharing-user table stored in association with user identifier information included in the received sharing-user identifier information registration request. That is to say, the sharing-user identifier information processor 42 executes a process of causing the user profile server functions part 50 to store sharing-user identifier information and user identifier information for identifying the user of the user equipment 2a, 2b having transmitted the sharing-user identifier information in association with each other.

The content marker information processor 43 accepts a content marker registration request as a process request received by the information transceiver 41. A content marker registration request includes sharing permission information, content marker information, and user identifier information for identifying the user of the user equipment 2a, 2b. Sharing permission information is information representing whether to permit sharing of content marker information with another user. Then, the content marker information processor 43 updates the content marker table stored in the user profile server functions part 50, based on the accepted content marker registration request.

To be specific, when the information transceiver 41 receives a content marker registration request, the content marker information processor 43 generates content marker identifier information. Then, the content marker information processor 43 adds content marker registration information composed of content marker information included in the content marker registration request and the generated content marker identifier information to a content marker table stored in association with user identifier information included in the received content marker registration request.

That is to say, the content marker information processor 43 executes a process of causing the user profile server functions part 50 to store the content marker information and the user identifier information included in the content marker registration request in association with each other.

Furthermore, in a case that the sharing permission information included in the content marker registration request represents that sharing of the content marker information with another user is permitted, the content marker information processor 43 specifies a sharing-user table stored in association with the user identifier information included in the content marker registration request among the sharing-user tables stored by the user profile server functions part 50.

Besides, the content marker information processor 43 acquires sharing-user identifier information included in the specified sharing-user table. Then, the content marker information processor 43 generates content marker identifier information with respect to each of the acquired sharing-user identifier information, and also adds content marker registration information composed of the content marker information included in the content marker registration request and the generated content marker identifier information, to a content marker table stored in association with the sharing-user identifier information as user identifier information.

That is to say, in a case that the sharing permission information included in the content marker registration request represents that sharing of content marker information with another user is permitted, the content marker information processor 43 executes a process of causing the user profile server functions part 50 to store user identifier information identical to the sharing-user identifier information stored in association with the abovementioned user identifier information and the content marker information, in association with each other.

Further, the content marker output request processor 44 accepts a content marker output request as a process request received by the information transceiver 41. A content marker output request is information including user identifier information and requesting for an output of content marker information.

The content marker outputting part 45 specifies a content marker table and a viewing authority table that are stored in association with user identifier information identical to the user identifier information included in the content marker output request accepted by the content marker output request processor 44. The content marker outputting part 45 then acquires content marker information included in the specified content marker table.

Furthermore, for each of the acquired content marker information, the content marker outputting part 45 specifies viewing authority information including content identifier information included in the content marker information from among viewing authority information included in the specified viewing authority table, and acquires viewing permission information included in the specified viewing authority information. Then, the content marker outputting part 45 outputs information in which the acquired content marker information and the acquired viewing permission information are associated one by one.

That is to say, the content marker outputting part 45 extracts content marker information stored in association with user identifier information identical to the user identifier information included in the accepted content marker output request and, for each of the extracted content marker information, acquires viewing permission information stored in association with the content identifier information and the user identifier information that are included in the content marker information, and outputs the content marker information and the acquired viewing permission information in association with each other.

Then, the information transceiver 41 transmits the content marker information and the viewing permission information that are outputted by the content marker outputting part 45 to the user equipment 2a, 2b having transmitted the content marker output request.

The delivery requesting part 46 accepts a content transmission request as a process request received by the information transceiver 41. A content transmission request is information that is transmitted by the user equipment 2a, 2b and that includes user identifier information, equipment address information and content marker information.

The delivery requesting part 46 specifies a viewing authority table stored in association with user identifier information identical to the user identifier information included in the accepted content transmission request.

In a case that viewing authority information composed of a pair of content identifier information included in the accepted content transmission request and viewing permission information representing permission of transmission of content data to the user equipment 2a, 2b is included in the specified viewing authority table, the delivery requesting part 46 outputs a content transmission instruction including content identifier information and equipment address information included in the content transmission request. The information transceiver 41 transmits a pair of the content transmission instruction outputted by the delivery requesting part 46 to the media server 4b via the Core IMS part 30.

On the other hand, in a case that viewing authority information composed of a pair of content identifier information included in the accepted content transmission request and viewing permission information representing permission of transmission of content data to the user equipment 2a, 2b is not included in the specified viewing authority table, the delivery requesting part 46 does not output a content transmission instruction.

(Function: Media Server)

The function of the media server 4b includes a media functions part (MF) 60. The media functions part 60 includes a media control functions part (MCF) and a media delivery functions part (MDF).

The media functions part 60 includes an information transceiver 61, a content delivery controller 62, a content storing part 63, and a content delivering part (part of a content transmitting means) 64.

The information transceiver 61 receives a variety of information transmitted by the service control server 4a via the Core IMS part 30. Moreover, the information transceiver 61 transmits a variety of information to the service control server 4a via the Core IMS part 30.

Furthermore, the information transceiver 61 receives a content viewing request from the user equipment 2a, 2b. A content viewing request includes content identifier information, a playing start position, and a playing finish position. Besides, the information transceiver 61 receives a playing start request in accordance with a predetermined communication protocol (RTSP (Real Time Streaming Protocol) in this exemplary embodiment) from the user equipment 2a, 2b. A playing start request is information representing a request for start of transmission of content data.

In a case that the information transceiver 61 receives a content transmission instruction, the content delivery controller 62 determines a media server to transmit content data, based on content identifier information and equipment address information included in the content transmission instruction. The content delivery controller 62 transmits media delivery specification information for specifying the determined media server and the content identifier information to the service control server 4a via the Core IMS part 30.

The service control server 4a determines a communication bandwidth necessary for transmitting content data identified with the content identifier information, based on the media delivery specification information and the content identifier information having been received. The service control server 4a transmits a bandwidth guarantee instruction including communication bandwidth information representing the determined communication bandwidth and the received media delivery specification information, to the Core IMS part 30. Furthermore, the service control server 4a transmits the media delivery specification information and the content identifier information having been received, to the user equipment 2 via the Core IMS part 30.

The content storing part 63 previously stores content data representing content in association with content identifier information.

When the information transceiver 61 receives a playing start request, the content delivering part 64 specifies content data identified with content identifier information included in a content viewing request received by the information transceiver 61 among the content data stored in the content storing part 63.

Then, the content delivering part 64 transmits a portion of the specified content data between the playing start position and the playing finish position included in the content viewing request. At this moment, the content delivering part 64 uses the session established by the Core IMS part 30 to transmit the data in accordance with a predetermined communication protocol (in this exemplary embodiment, RTP (Real-time Transport Protocol).

(Function: Portal Server)

The function of the portal server 5 includes a service selection functions (SSF) part 20. The service selection functions part 20 includes a portal screen transmitter 21.

The portal screen transmitter 21 receives a portal screen request transmitted by the user equipment 2a, 2b. The portal screen transmitter 21 transmits portal screen information to the user equipment 2a, 2b in accordance with the received portal screen request.

Further, the service selection functions part 20 includes a content list storing part and a content list transmitter, which are not shown in the drawings.

The content list storing part has a storing device of the portal server 5 previously store content list information representing a list of content represented by content data stored by the media functions part 60.

The content list transmitter receives a content list request transmitted by the user equipment 2a, 2b. The content list transmitter transmits the stored content list information to the user equipment 2a, 2b in response to the received content list request.

(Operation)

Next, an operation of the content delivery system 1 will be specifically described.

(Operation: Authenticating Process)

Figure 4:
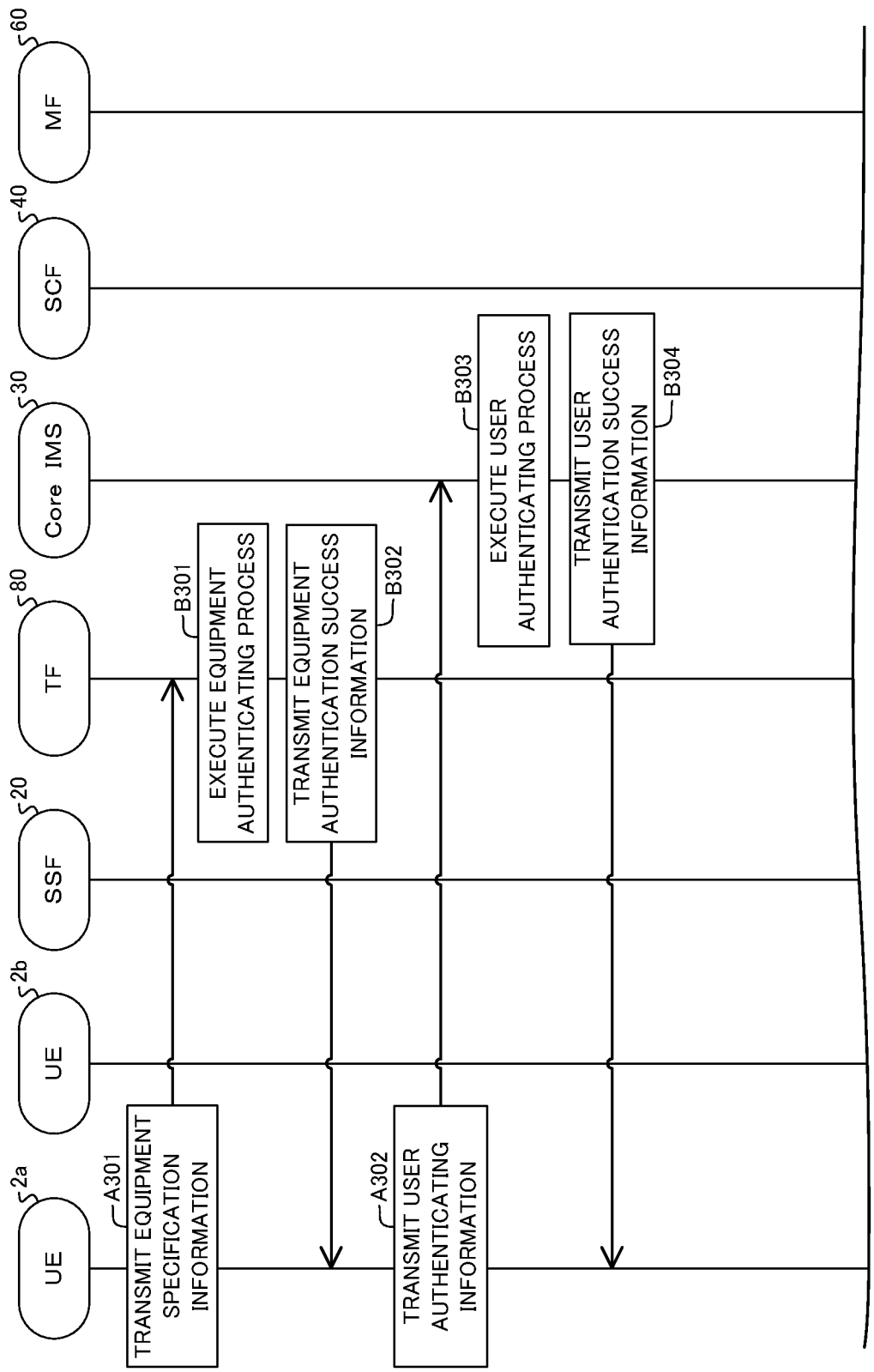
FIG. 4 is a sequence diagram showing an operation of the content delivery system shown in FIG. 1 when authenticating user equipment and a user of the user equipment.

An operation of the content delivery system 1 when the content delivery system 1 authenticates the user of equipment 2a and the user of the user equipment 2a will be described with reference to a sequence diagram of FIG. 4.

First, the user UA turns on the power switch of the user equipment 2a, whereby electric power is supplied to the user equipment 2a. Consequently, the user equipment 2a transmits an equipment authenticating process request including stored equipment specification information to the connection control server 3a (the transport functions part 80) (step A301).

The transport functions part 80 determines whether or not the equipment specification information included in the received equipment authenticating process request corresponds to (in this exemplary embodiment, coincides with) previously stored equipment authenticating criterion information, thereby determining whether the user equipment 2a is valid equipment or not (executing an equipment authenticating process) (step B301). Then, in a case that the user equipment 2a is authenticated as valid equipment, the transport functions part 80 transmits equipment authentication success information to the user equipment 2a (step B302). Equipment authentication success information is information including equipment address information and representing that the user equipment 2a is authenticated as valid equipment.

Upon reception of the equipment authentication success information, the user equipment 2a causes the not-shown television to display an image prompting a user UA to input user authenticating information. Consequently, the user UA manipulates the remote controller to input user authenticating information.

Then, upon acceptance of the input of the user authenticating information, the user equipment 2a transmits a user authenticating process request including the accepted user authenticating information to the Core IMS part 30 (step A302).

Consequently, the Core IMS part 30 receives the user authenticating process request (a user authenticating information receiving step). The Core IMS part 30 determines whether or not the user authenticating information included in the received user authenticating process request corresponds to (in this exemplary embodiment, coincides with) previously stored user authenticating criterion information, thereby determining whether the user identified with the user identifier information included in the user authenticating criterion information (the user having inputted the user authenticating information) is a valid user or not (executing a user authenticating process) (step B303, a user authenticating step). Then, in a case that the user having inputted the user authenticating information is authenticated as a valid user, the Core IMS part 30 transmits user authentication success information to the user equipment 2a (step B304).

Consequently, the user equipment 2a receives the user authentication success information. Then, the user equipment 2a thereafter transmits (an SIP message including) a process request including the user authentication success information to the Core IMS part 30.

(Operation: Sharing-User Registering Process)

Next, an operation of the content delivery system 1 when the content delivery system 1 registers a user/users who shares/share content marker information, in response to an input by the user UA of the user equipment 2a will be described with reference to a sequence diagram of FIG. 4.

Firstly, the user equipment 2a transmits a portal screen request to the service selection functions part 20 (step A401). Consequently, in response to the received portal screen request, the service selection functions part 20 transmits portal screen information representing a portal screen to the user equipment 2a (step B401). Then, the user equipment 2a causes the not-shown television to display an image represented by the received portal screen information. This image includes an input field for inputting the sharing-user identifier information and a button for instructing to request for registration of the sharing-user identifier information.

The user UA of the user equipment 2a then inputs the sharing-user identifier information via the remote controller. Moreover, the user UA performs an operation of pressing own the button for instructing to request for registration of the sharing-user identifier information.

Consequently, the user equipment 2a transmits a sharing-user identifier information registration request that includes the user authentication success information as user identifier information for identifying the user UA and the inputted sharing-user identifier information, to the service control functions part 40 via the Core IMS part 30 (through the Core IMS part 30) (step A402).

Consequently, the service control functions part 40 receives the sharing-user identifier information registration request (a sharing-user identifier information accepting step). Next, the service control functions part 40 specifies a sharing-user table stored in association with the user identifier information included in the received sharing-user identifier information registration request among the sharing-user tables stored in the user profile server functions part 50.

Then, the service control functions part 40 adds (registers) the sharing-user identifier information included in the received sharing-user identifier information registration request to the specifies sharing-user table (step C401, a sharing-user identifier information storing process step).

Then, the service control functions part 40 transmits a sharing-user identifier information registration completion notice to the user equipment 2a via the Core IMS part 30 (step C402). A sharing-user identifier information registration completion notice is a notice representing that registration of sharing-user identifier information has been completed. Then, upon reception of the sharing-user identifier information registration completion notice, the user equipment 2a causes the not-shown television to display an image representing that registration of the sharing-user identifier information has been completed.

(Operation: Content List Acquiring Process)

Figure 6:
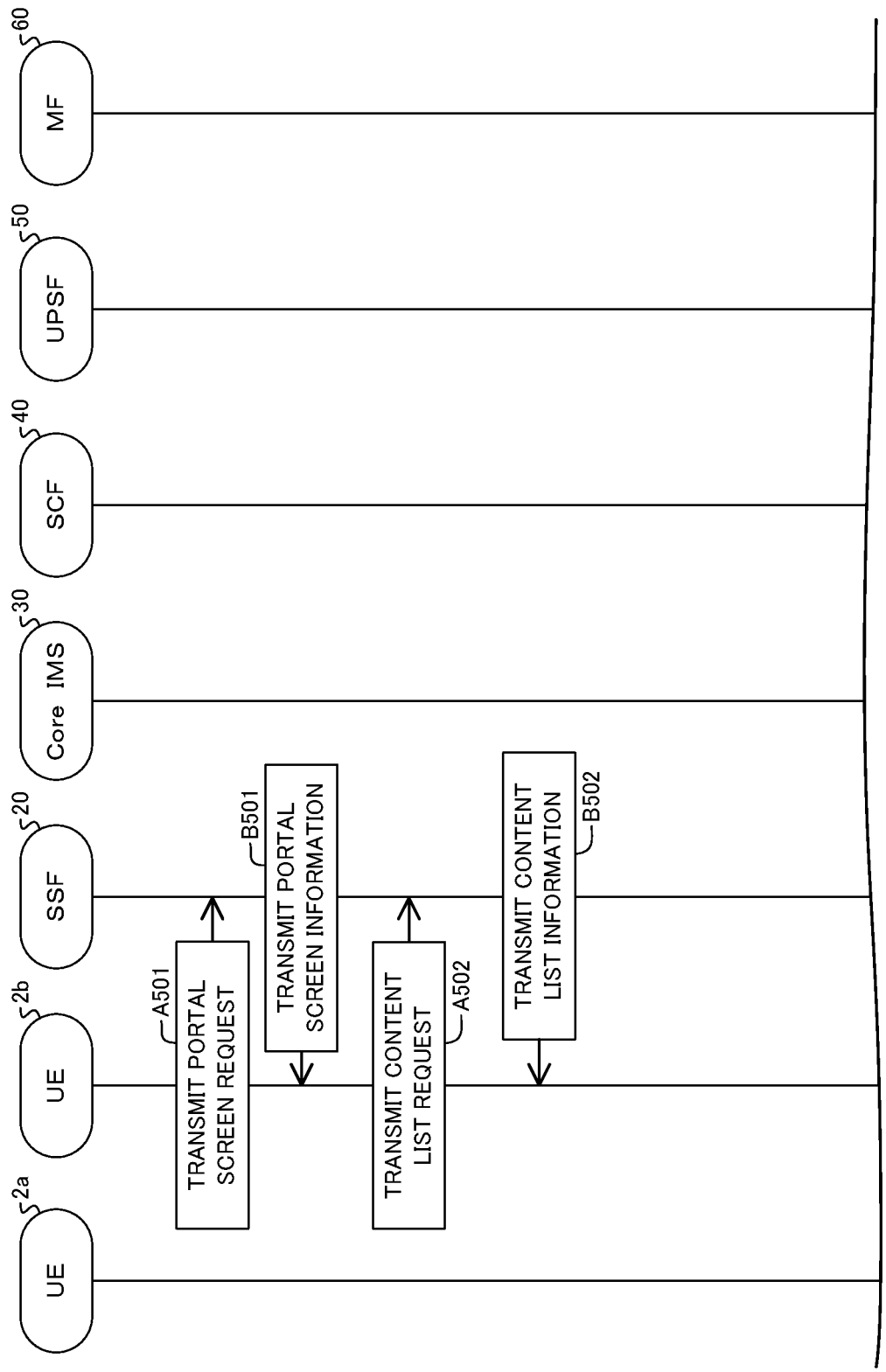
FIG. 6 is a sequence diagram showing an operation of the content delivery system shown in FIG. 1 when acquiring a list of content in response to an input by the user of the user equipment.

Next, an operation of the content delivery system 1 when the content delivery system 1 acquires a list of content in response to an input by a user UB of the user equipment 2b will be described with reference to a sequence diagram of FIG. 6.

Firstly, in a like manner as the user equipment 2a (refer to FIG. 4), the user equipment 2b transmits an equipment authenticating process request to the transport functions part 80 and transmits a user authenticating process request to the Core IMS part 30, thereby receiving user authentication success information from the Core IMS part 30.

Then, the user equipment 2b transmits a portal screen request to the service selection functions part 20 (step A501). Consequently, in response to the received portal screen request, the service selection functions part 20 transmits portal screen information representing a portal screen to the user equipment 2b (step B501). Then, the user equipment 2b causes the not-shown television to display an image represented by the received portal screen information. This image includes a menu for instructing to request for a content list.

The user UB of the user equipment 2b then inputs information for selecting the menu for instructing to request for a content list. Consequently, the user equipment 2b transmits a content list request as a process request including the user authentication success information to the service selection functions part 20 (step A502).

Consequently, the service selection functions part 20 receives the content list request. Next, the service selection functions part 20 transmits the stored content list information to the user equipment 2b (step B502). Then, upon reception of the content list information, the user equipment 2b causes the not-shown television to display a list of content represented by the content list information.

It is preferred that the service selection functions part 20 is configured to acquire content list information representing a list of content represented by content data stored in the media server 4b (the media functions part 60) every time a preset period elapses and replace the stored content list information with the acquired content list information.

Further, the user equipment 2b may be configured to transmit a content list request to not the service selection functions part 20 but the service control functions part 40. In this case, when receiving a content list request, the service control functions part 40 acquires content list information representing a list of content represented by content data stored in the media server 4b (the media functions part 60), and transmits the acquired content list information to the user equipment 2b via the Core IMS part 30.

(Operation: Content Marker Registering Process)

Next, an operation of the content delivery system 1 when the content delivery system 1 registers content marker information in response to an input by the user UB of the user equipment 2b will be described with reference to a sequence diagram of FIG. 7.

In a state that a content list is displayed on the television, the user UB of the user equipment 2b selects content and inputs content specification information that specifies the selected content. Content specification information includes content identifier information. Moreover, the user UB inputs information representing a playing start position and a playing finish position of the selected content.

In addition, the user UB inputs sharing permission information that represents whether to permit sharing of content marker information with another user.

Consequently, the user equipment 2b transmits a content marker registration request that includes content marker information including the inputted sharing permission information, content identifier information, the playing start position and the playing finish position, and the user authentication success information as user identifier information for identifying the user UB, to the service control functions part 40 via the Core IMS part 30 (step A601).

Consequently, the service control functions part 40 receives the content marker registration request (a content marker information accepting step). Next, the service control functions part 40 generates content marker identifier information. Moreover, the service control functions part 40 specifies a content marker table stored in association with the user identifier information included in the received content marker registration request among the content marker tables stored in the user profile server functions part 50.

Then, the service control functions part 40 adds content marker registration information composed of the content marker information included in the received content marker registration request and the generated content marker identifier information, to the specified content marker table.

Furthermore, in a case that the sharing permission information included in the content marker registration request represents that sharing of the content marker information with another user is permitted, the service control functions part 40 adds the content marker information to a content marker table stored in association with a user/users who shares/share the content marker information.

Assuming the sharing permission information included in the content marker registration request represents that sharing of the content marker information with another user is permitted, the description will be continued. In this case, the service control functions part 40 specifies a sharing-user table stored in association with the user identifier information included in the content marker registration request among sharing-user tables stored in the user profile server functions part 50.

Furthermore, the service control functions part 40 acquires sharing-user identifier information included in the specified sharing-user table. Then, the service control functions part 40 generates content marker identifier information with respect to each of the acquired sharing-user identifier information, and also adds the content marker registration information composed of the content marker information included in the abovementioned content marker registration request and the generated content marker identifier information, to a content marker table stored in association with the sharing-user identifier information (step B601; a content marker information storing processing step).

In a case that the sharing permission information included in the content marker registration request represents that sharing of the content marker information with another user is not permitted, the service control functions part 40 does not register the content marker information to a content marker table other than the content marker table stored in association with the user identifier information included in the content marker registration request.

Then, the service control functions part 40 transmits a content marker information registration completion notice to the user equipment 2b via the Core IMS part 30 (step B602). A content marker information registration completion notice is a notice representing that registration of content marker information has been completed. Then, upon reception of the content marker information registration completion notice, the user equipment 2b causes the not-shown television to display an image representing that registration of the content marker information has been completed.

In the description of the operation of the content delivery system 1 hereinbefore, the user UA selects one piece of content from a content list, and thereby registers content marker information including content identifier information for identifying the selected content to the content delivery system 1.

The operation of the content delivery system 1 when the user UA selects one piece of content marker information from a content marker information list and thereby registers the selected content marker information to the content delivery system 1 can also be described in a like manner. Moreover, the operation of the content delivery system 1 when the user UA registers content marker information including content identifier information for identifying content the user is viewing to the content delivery system 1 can also be described in a like manner.

(Operation: Content Marker Information Acquiring Process)

Figure 8:
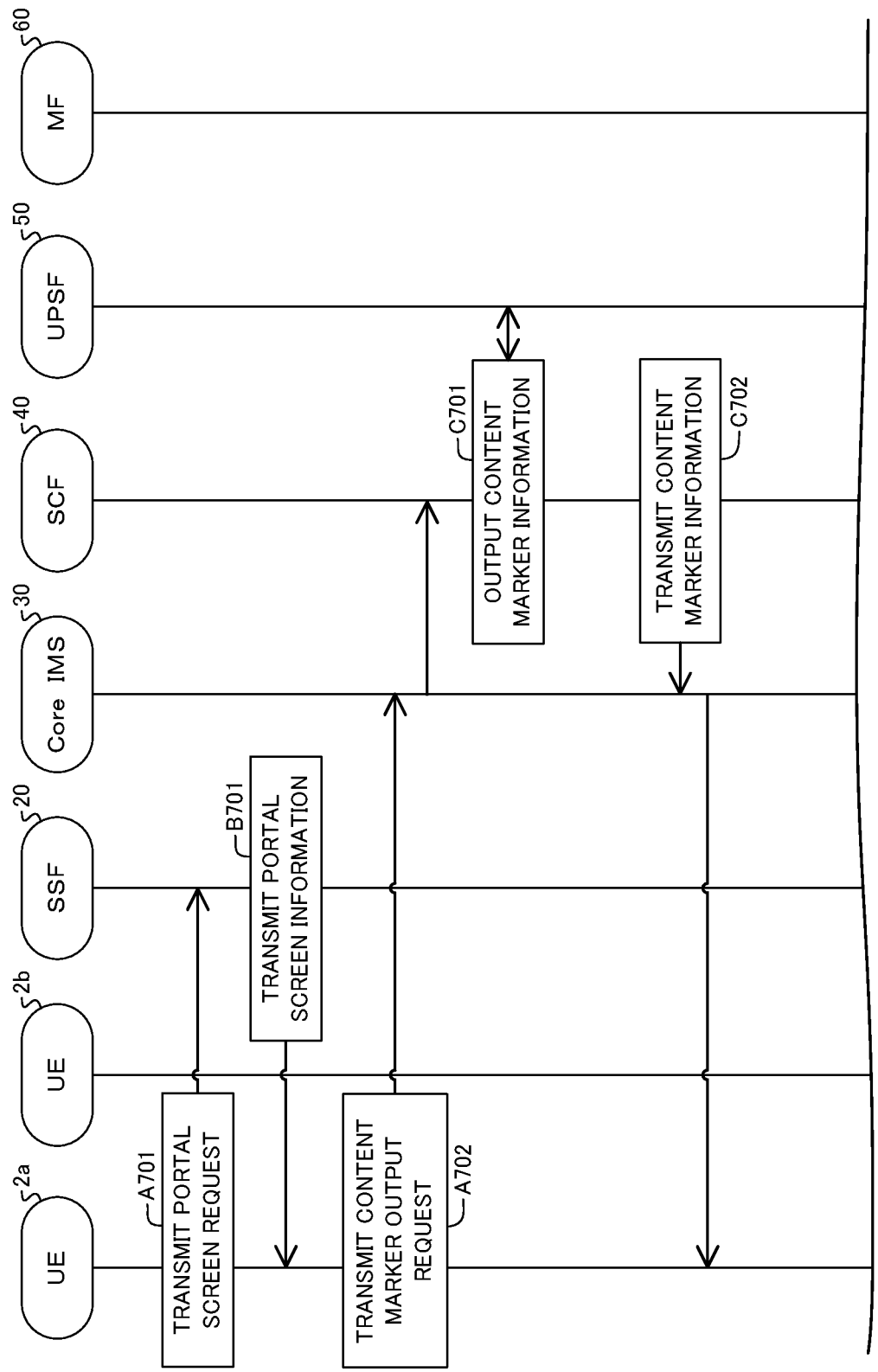
FIG. 8 is a sequence diagram showing an operation of the content delivery system shown in FIG. 1 when acquiring a list of content marker information in response to an input by the user of the user equipment.

Next, an operation of the content delivery system 1 when the content delivery system 1 acquires content marker information in response to an input by the user UA of the user equipment 2a will be described with reference to a sequence diagram of FIG. 8.

Firstly, the user equipment 2a transmits a portal screen request to the service selection functions part 20 (step A701). Consequently, in response to the received portal screen request, the service selection functions part 20 transmits portal screen information representing a portal screen to the user equipment 2a (step B701). Then, the user equipment 2a causes the not-shown television to display an image represented by the received portal screen information. This image includes a menu for instructing to request for an output of content marker information.

The user UA of the user equipment 2a then inputs information on selection of the menu for instructing to request for an output of content marker information. Consequently, the user equipment 2a transmits a content marker output request that includes user authentication success information as user identifier information for identifying the user UA and that requests for an output of content marker information, to the service control functions part 40 via the Core IMS part 30 (step A702).

Consequently, the service control functions part 40 receives the content marker output request (a content marker output request accepting step). Then, the service control functions part 40 specifies a content marker table and a viewing authority table that are stored in association with user identifier information identical to the user identifier information included in the received content marker output request, among the content marker tables and the viewing authority tables that are stored in the user profile server functions part 50.

Furthermore, the service control functions part 40 acquires content marker information included in the specified content marker table. Additionally, the service control functions part 40, for each of the acquired content marker information, specifies viewing authority information including content identifier information included in the content marker information from among viewing authority information included in the specified viewing authority table, and acquires viewing permission information included in the specified viewing authority information.

Then, the service control functions part 40 outputs information in which the acquired content marker information and the acquired viewing permission information are associated one by one (step C701; part of a content marker transmitting step).

Then, the service control functions part 40 associates the outputted content marker information with the outputted viewing permission information and transmits to the user equipment 2a (having transmitted the content marker output request) via the Core IMS part 30 (step C702; part of the content marker transmitting step).

Then, upon reception of the content marker information and the viewing permission information, the user equipment 2a causes the not-shown television to display a list of the received content marker information (a content marker list outputting step).

Figure 9:
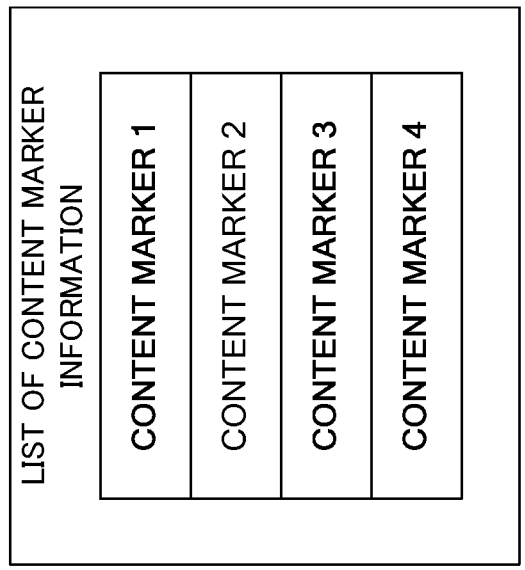
FIG. 9 is a view showing an image outputted by the user equipment and representing a list of content marker information.

At this moment, as shown in FIG. 9, the user equipment 2a outputs an image showing, among the received content marker information, content marker information (viewable content marker information; in this exemplary embodiment, "content marker 1," "content marker 3" and "content marker 4") associated with viewing permission information representing permission of transmission of content data to the user equipment 2 in bold letters. On the other hand, the user equipment 2a outputs an image showing, among the received content marker information, content marker information (not-viewable content marker information; in this exemplary embodiment, "content marker 2") associated with viewing permission information representing non-permission of transmission of content data to the user equipment 2 in light letters. That is to say, the user equipment 2a highlights viewable content marker information more than not-viewable content marker information.

According to this, it is possible to have the user UA of the user equipment 2a recognize whether the user UA can view content identified by content marker information. As a result, it is possible to increase convenience for the user UA.

The user equipment 2a may be configured to output an image showing viewable content marker information in black letters, whereas output an image showing not-viewable content marker information in gray letters.

(Operation: Content Viewing Process)

Figure 10:
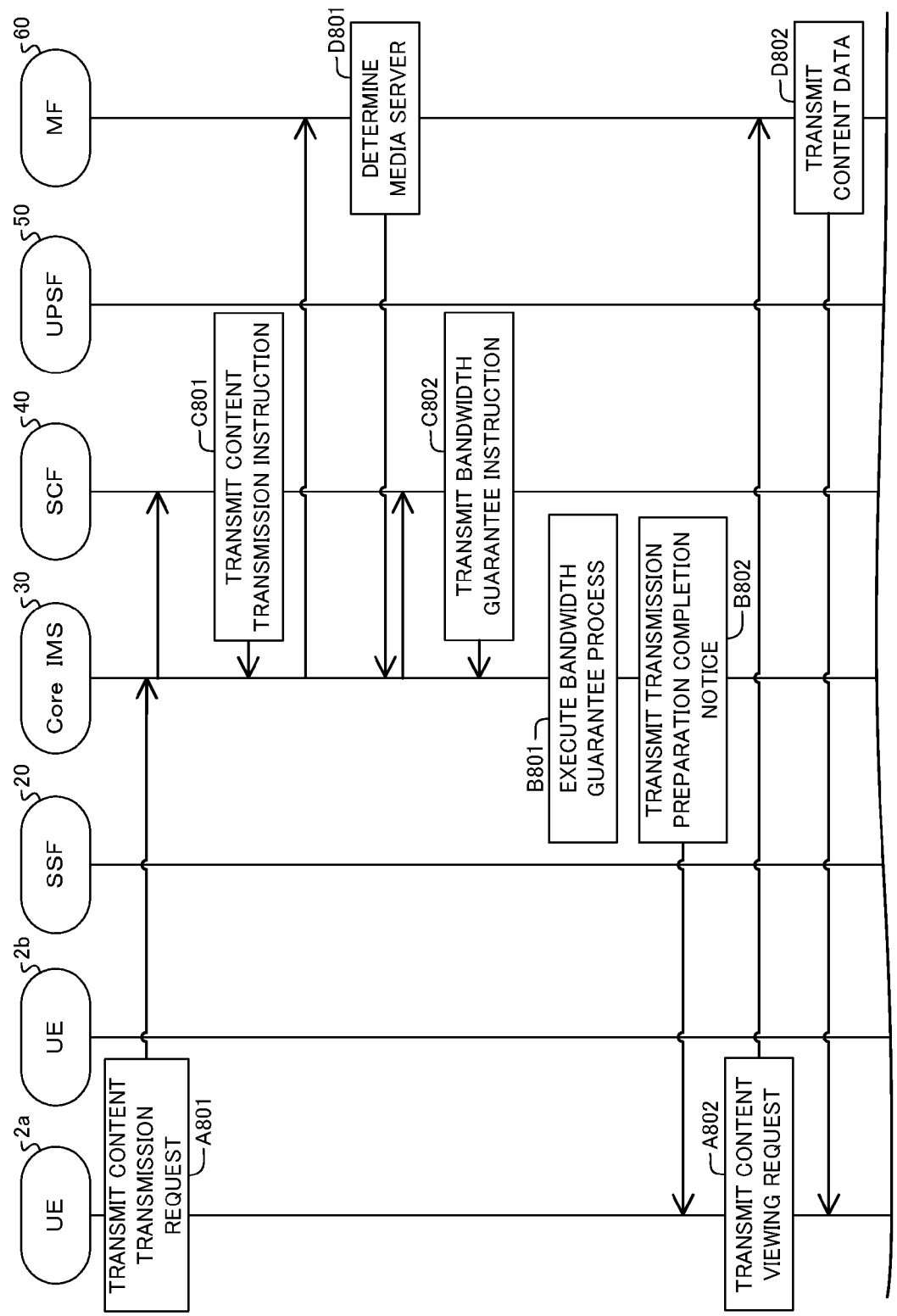
FIG. 10 is a sequence diagram showing an operation of the content delivery system shown in FIG. 1 when transmitting content data to the user equipment in response to an input by the user of the user equipment.

Next, an operation of the content delivery system 1 when the content delivery system 1 transmits content data to the user equipment 2a in response to an input by the user UA of the user equipment 2a will be described with reference to a sequence diagram of FIG. 10.

In a state that a list of content marker information is displayed on the television, the user UA of the user equipment 2a selects content marker information, and inputs content marker specification information for specifying the selected content marker information.

Consequently, the user equipment 2a accepts the inputted content marker specification information, and transmits a content transmission request as a process request that includes content identifier information included in content marker information specified by the accepted content marker specification information, user authentication success information as user identifier information for identifying the user UA and equipment address information, to the service control functions part 40 via the Core IMS part 30 (step A801).

Then, the service control functions part 40 receives the content transmission request. Next, the service control functions part 40 specifies a viewing authority table stored in association with user identifier information identical to the user identifier information included in the received content transmission request, from among the viewing authority tables stored in the user profile server functions part 50.

Then, the service control functions part 40 determines whether or not viewing authority information composed of a pair of the content identifier information included in the content transmission request and viewing permission information representing permission of transmission of content data to the user equipment 2a is included in the specified viewing authority table.

Assuming viewing authority information composed of a pair of the content identifier information included in the content transmission request and viewing permission information representing permission of transmission of content data to the user equipment 2a is included in the specified viewing authority table, a description will be continued.

In this case, the service control functions part 40 transmits a content transmission instruction including the content identifier information and the equipment address information that are included in the content transmission request, to the media functions part 60 via the Core IMS part 30 (step C801; part of the content transmitting step). A content transmission instruction includes equipment address information, user identifier information, and content identifier information.

In a case that viewing authority information composed of a pair of the content identifier information included in the content transmission request and viewing permission information representing permission of transmission of content data to the user equipment 2*a* is not included in the specified viewing authority table, the service control functions part 40 does not transmit a content transmission instruction. Therefore, in this case, the content data is not transmitted from the media functions part 60 to the user equipment 2*a*. That is to say, the user UA of the user equipment 2*a* cannot view the content.

According to the abovementioned assumption, the media functions part 60 receives the content transmission instruction. Then, the media functions part 60 determines a media server to transmit content data, based on the content identifier information and the equipment address information included in the content transmission instruction. Moreover, the media functions part 60 transmits media delivery specification information for specifying the determined media server (in this exemplary embodiment, the media server 4*b*) and the content identifier information to the service control functions part 40 via the Core IMS part 30 (step D801).

Consequently, the service control functions part 40 receives the media delivery specification information and the content identifier information. Then, based on the received media delivery specification information and content identifier information, the service control functions part 40 determines a communication bandwidth necessary for transmission of content data identified with the content identifier information.

Furthermore, the service control functions part 40 transmits a bandwidth guarantee instruction, which includes communication bandwidth information representing the determined communication bandwidth and the received media delivery specification information and content identifier information, to the Core IMS part 30 (step C802).

Upon reception of the bandwidth guarantee instruction, the Core IMS part 30 establishes a connection (a session) between the media server 4*b* and the user equipment 2*a* (a connection establishing step). Moreover, the Core IMS part 30 transmits the received communication bandwidth information, and communication path specification information that specifies a communication path between the media server 4*b* specified with the received media delivery specification information and the user equipment 2*a*, to the transport functions part 80. Consequently, the transport functions part 80 executes a process for guaranteeing the communication path represented by the received communication bandwidth information, in the communication path specified with the received communication path specification information (a bandwidth guaranteeing process) (step B801).

Then, when the bandwidth guaranteeing process is completed, the Core IMS part 30 transmits a transmission preparation completion notice to the user equipment 2*a* (step B802). A transmission preparation completion notice includes the received media delivery specification information and content identifier information.

Then, upon reception of the transmission preparation completion notice, the user equipment 2*a* transmits a content viewing request and a playing start request to the media server 4*b* (the media functions part 60) specified with the media delivery specification information included in the transmission preparation completion notice (step A802). A content viewing request includes the content identifier information included in the transmission preparation completion notice, and a playing start position and a playing finish position that are included in content marker information specified with the inputted content marker specification information described above.

Then, upon reception of the content viewing request and the playing start request, the media functions part 60 specifies content data identified with the content identifier information included in the received content viewing request, among content data stored in the content storing part 63.

Next, the media functions part 60 transmits, of the specified content data, a portion from the playing start position to the playing finish position included in the content viewing request to the user equipment 2*a* (step D802; part of the content transmitting step). At this moment, the media functions part 60 transmits the data by using the session established by the Core IMS part 30. Consequently, the user equipment 2*a* receives the content data, and causes the not-shown television to output content represented by the received content data.

Hereinbefore, the operation of the content delivery system 1 when the user UA selects one piece of content marker information from a content marker information list and the content delivery system 1 thereby transmits content data corresponding to the selected content marker information to the user equipment 2*a* has been described. The operation of the content delivery system 1 when the user UA selects one piece of content from a content list and the content delivery system 1 transmits content data representing the selected content to the user equipment 2*a* can also be described in a like manner. Moreover, the operation of the content delivery system 1 when transmitting content data to the user equipment 2*b* can also be described in a like manner.

As described hereinbefore, according to the first exemplary embodiment of the content delivery system of the present invention, in the case of accepting a content marker output request from the user UA (a first user), the content delivery system 1 can transmit content marker information set to be shared with the user UA among content marker information registered by the user UB (another user), to the user equipment 2*a* used by the user UA. As a result, it is possible to permit only the user UA to view the content marker information registered by the user UB other than the user UA. That is to say, it is possible to increase the convenience of the users UA and UB.

Further, the user equipment 2*a* transmits a content transmission request including content identifier information included in received content marker information (i.e., requests content based on content marker information), thereby being capable of receiving content data identified by the content identifier information. Therefore, the user UA of the user equipment 2*a* can view content that the user UA wants to view without performing a cumbersome operation for specifying the content. As a result, it is possible to increase convenience for the user UA.

In addition, in the first exemplary embodiment, the content delivery system 1 prohibits transmission of content data associated with viewing permission information representing non-permission of content data to user equipment (e.g., the user equipment 2*b*). Therefore, by properly setting viewing permission information, the content delivery system 1 can transmit content data requested based on content marker information to only user equipment of a specific user (e.g., user equipment 2*a*). As a result, it is possible to allow only a specific user (e.g., the user UA) to view the content requested based on the content marker information.

Further, according to the first exemplary embodiment, the content delivery system 1 accepts a content marker output request including user identifier information for identifying a user who is authenticated as a valid user. Consequently, it is possible to prevent the content delivery system 1 from executing a process based on a content marker output request transmitted by a user who is not authenticated as a valid user. As a result, it is possible to prevent an invalid user from viewing content marker information.

Modified Example 1 of First Exemplary Embodiment

Next, a content delivery system according to a modified example 1 of the first exemplary embodiment of the present invention will be described. The content delivery system according to the modified example 1 is different from the content delivery system according to the first exemplary embodiment in that the service control server 4a (the service control functions part 40) executes a user authenticating process. Therefore, a description will be made below focusing on the different point.

(Operation: Authenticating Process)

Figure 11:
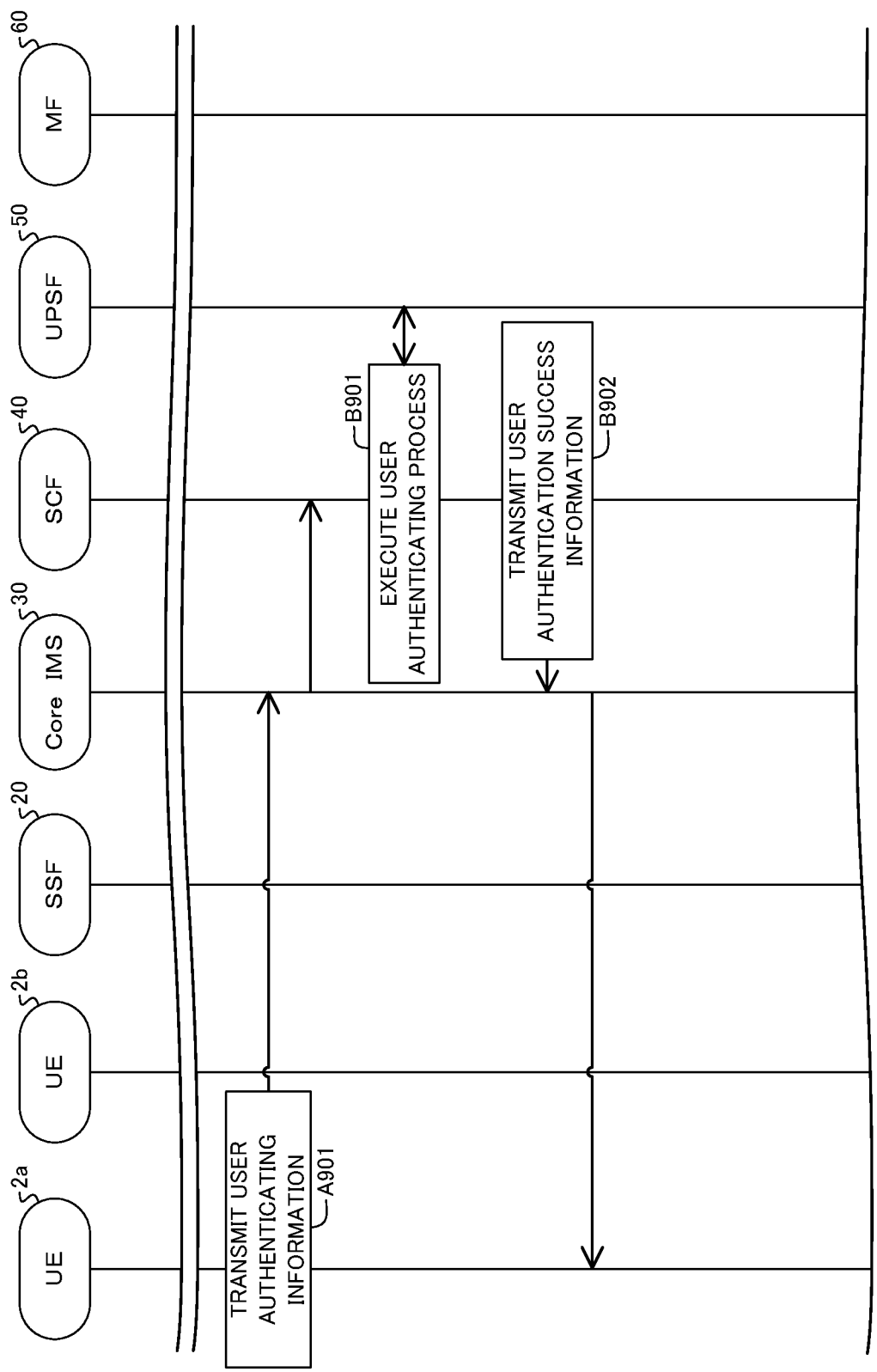
FIG. 11 is a sequence diagram showing an operation of a content delivery system according to a modified example 1 of the first exemplary embodiment when authenticating the user of the user equipment.

After receiving equipment authentication success information from the Core IMS part 30, as shown in FIG. 11, upon accepting an input of user authenticating information, the user equipment 2a of the content delivery system 1 transmits a user authenticating process request including the accepted user authenticating information to the service control functions part 40 via the Core IMS part 30 (step A901).

The service control functions part 40 executes a user authenticating process based on the user authenticating information included in the received user authenticating process request and the user authenticating criterion information stored in the user profile server functions part 50 (step B901). Then, in a case that a user identified with user identifier information is authenticated as a valid user, the service control functions part 40 transmits user authentication success information to the user equipment 2a via the Core IMS part 30 (step B902).

This modified example 1 can also produce like actions and effects as the first exemplary embodiment.

Modified Example 2 of First Exemplary Embodiment

Next, a content delivery system according to a modified example 2 of the first exemplary embodiment of the present invention will be described. The content delivery system according to the modified example 2 is different from the content delivery system according to the first exemplary embodiment in that the portal server 5 (the service selection functions part 20) executes a user authenticating process. Therefore, a description will be made below focusing on the different point.

The portal server 5 and the service control server 4a (the user profile server functions part 50) of the modified example 2 are configured to be capable of communicating with each other.

(Operation: Authenticating Process)

Figure 12:
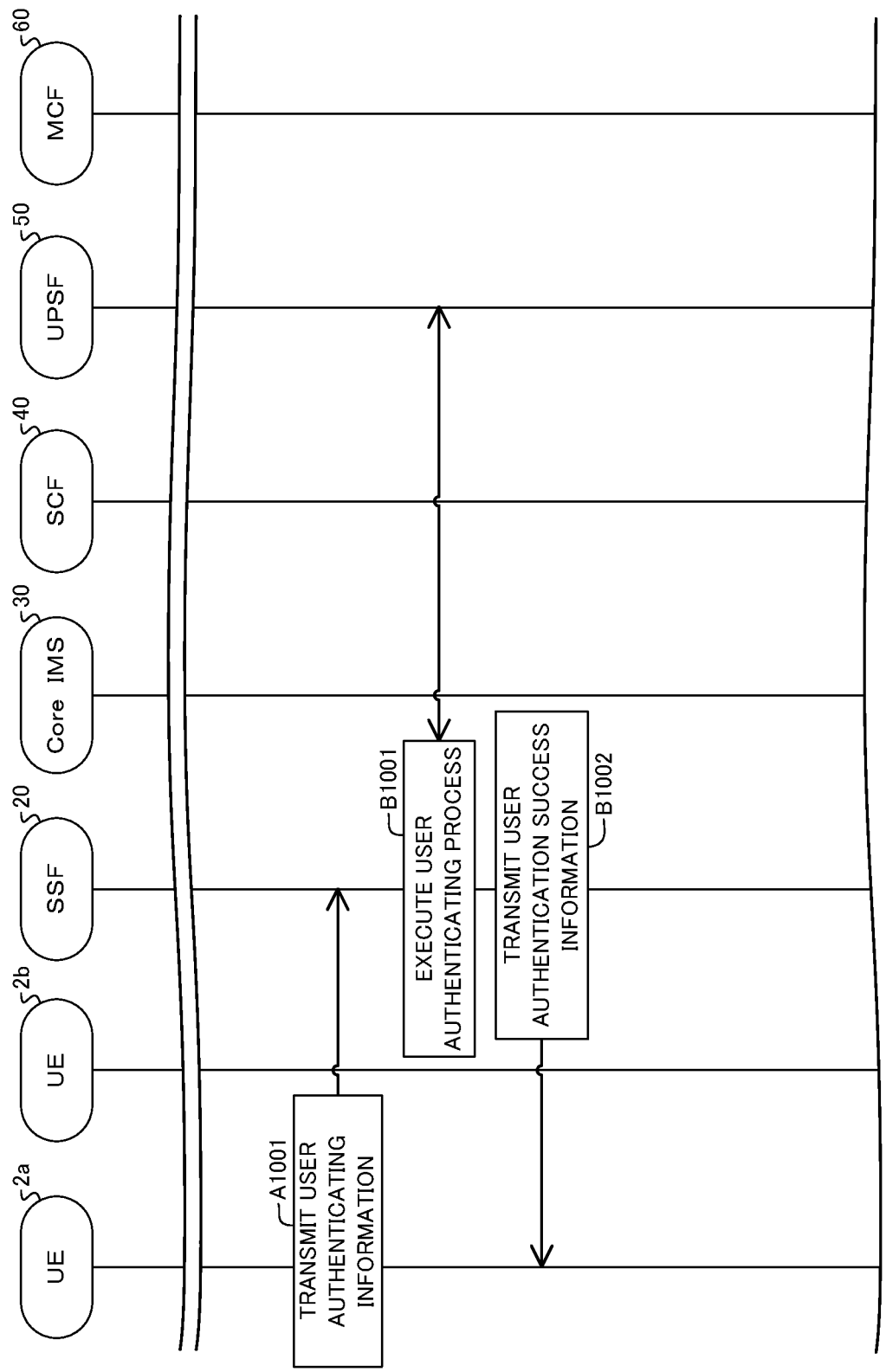
FIG. 12 is a sequence diagram showing an operation of a content delivery system according to a modified example 2 of the first exemplary embodiment when authenticating the user of the user equipment.

After reception of equipment authentication success information from the Core IMS part 30, as shown in FIG. 12, when accepting an input of user authenticating information, the user equipment 2a of the content delivery system 1 transmits a user authenticating process request including the accepted user authenticating information to the portal server 5 (the service selection functions part 20) (step A1001).

The service selection functions part 20 executes a user authenticating process based on the user authenticating information included in the received user authenticating process request and the user authenticating criterion information stored in the user profile server functions part 50 (step B1001). Then, in a case that a user identified with user identifier information is authenticated as a valid user, the service selection functions part 20 transmits user authentication success information to the user equipment 2a (step B1002).

This modified example 2 can also produce like actions and effects as the first exemplary embodiment.

Modified Example 3 of First Exemplary Embodiment

Next, a content delivery system according to a modified example 3 of the first exemplary embodiment of the present invention will be described. The content delivery system according to the modified example 3 is different from the content delivery system according to the first exemplary embodiment in that the user equipment 2a, 2b and the service control server 4a are configured to be capable of transmitting and receiving information directly (not via the Core IMS part 30). Therefore, a description will be made focusing on the different point.

Figure 13:
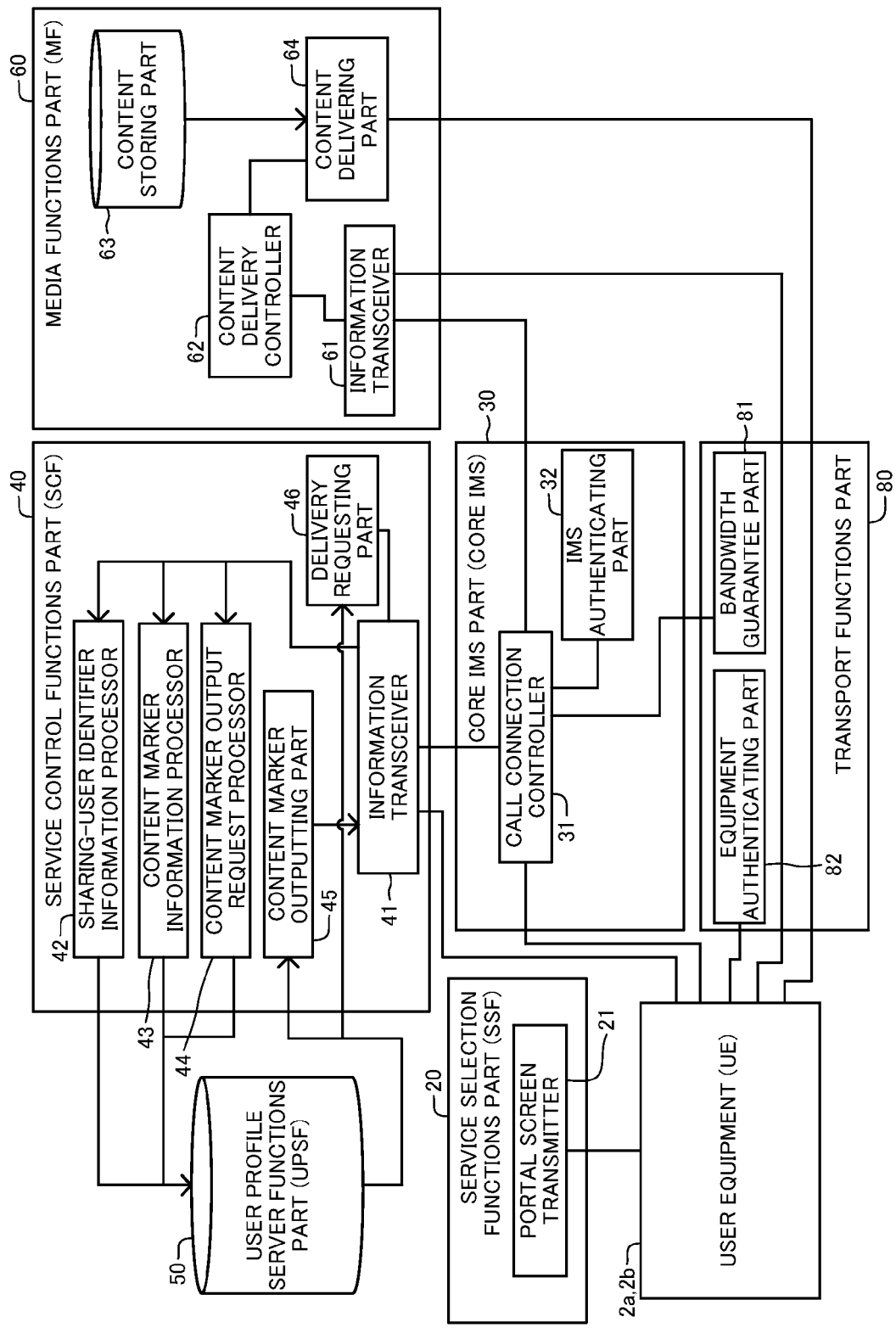
FIG. 13 is a block diagram schematically showing a function of a content delivery system according to a modified example 3 of the first exemplary embodiment.
Figure 14:
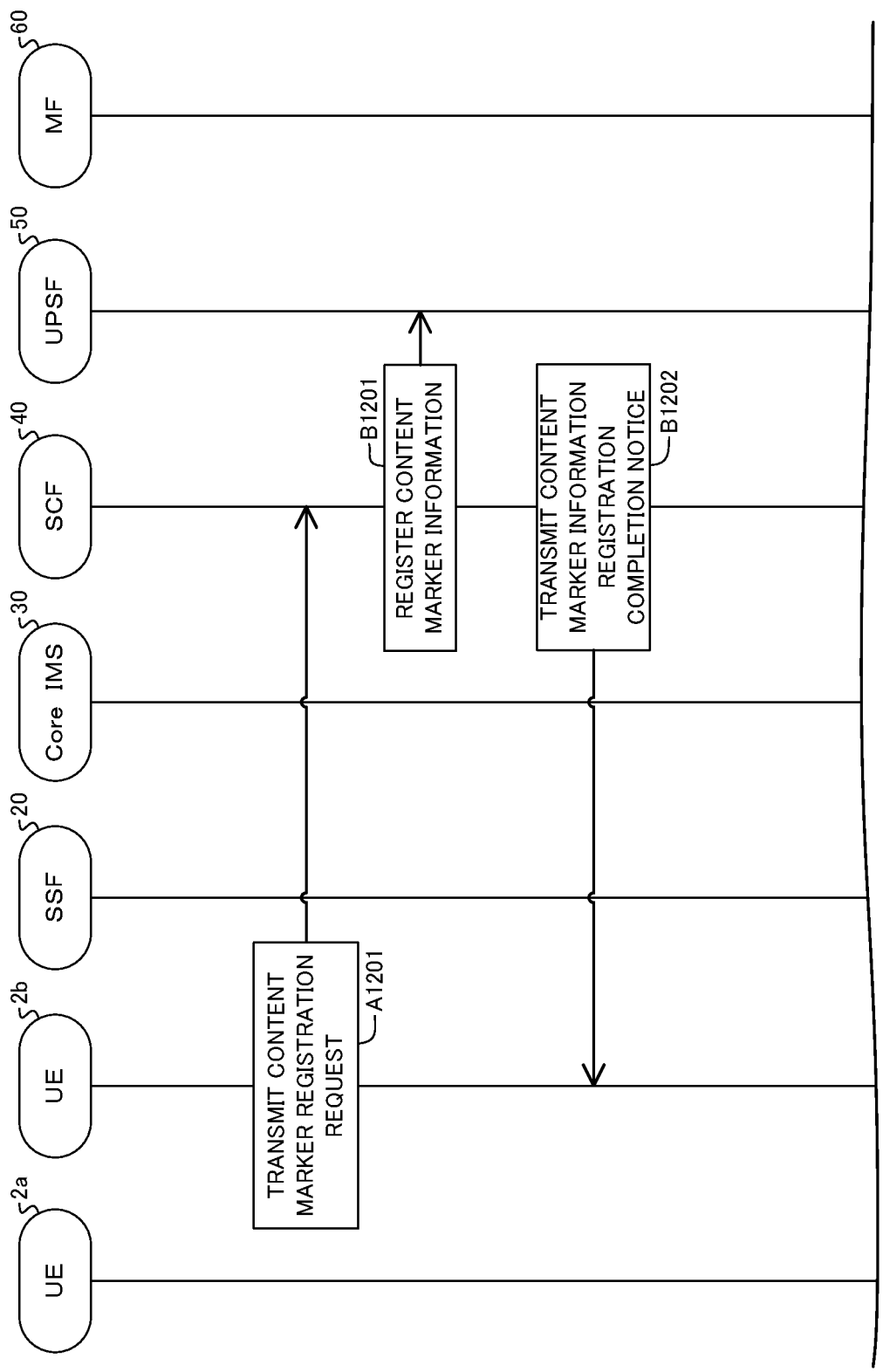
FIG. 14 is a sequence diagram showing an operation of the content delivery system according to the modified example 3 of the first exemplary embodiment when registering content marker information in response to an input by the user of the user equipment.

The information transceiver 41 of the content delivery system 1 transmits a variety of information (requests, instructions, notices, etc.) to the user equipment 2a, 2b not via the Core IMS part 30 as shown in FIG. 13. Moreover, the information transceiver 41 receives a variety of information transmitted by the user equipment 2a, 2b, not via the Core IMS part 30. In this exemplary embodiment, a variety of information is included in an SIP message Therefore, for example, in the first exemplary embodiment described above, at step A601 of FIG. 7, the user equipment 2b transmits a content marker registration request to the service control functions part 40 via the Core IMS part 30. On the other hand, in the modified example 3, at step A1201 of FIG. 14, the user equipment 2b transmits a content marker registration request to the service control functions part 40 directly (not via the Core IMS part 30).

In a like manner, in the first exemplary embodiment described above, at step B602 of FIG. 7, the service control functions part 40 transmits a content marker information registration completion notice to the user equipment 2b via the Core IMS part 30. On the other hand, in the modified example 3, at step B1202 of FIG. 14, the service control functions part 40 transmits a content marker information registration completion notice to the user equipment 2b directly (not via the Core IMS part 30).

Although a content marker registering process has been described as an example herein, other processes are also executed in a like manner.

This modified example 3 can also produce like actions and effects as the first exemplary embodiment described above. Moreover, according to this modified example 3, it is possible to reduce processing load on the connection control system 3 when the connection control system 3 transfers information.

Modified Example 4 of First Exemplary Embodiment

Next, a content delivery system according to a modified example 4 of the first exemplary embodiment of the present invention will be described. The content delivery system according to the modified example 4 is different from the content delivery system according to the first exemplary embodiment in that the user equipment 2a, 2b and the service control server 4a are configured to be capable of transmitting and receiving information via the portal server 5. Therefore, a description will be made below focusing on the different point.

The portal server 5 and the service control server 4a in this content delivery system 1 are configured to be capable of communicating with each other. In this example, the portal server 5 communicates with the service control server 4a by transmission and reception of SIP messages. The user equipment 2a, 2b communicates with the portal server 5 by transmission and reception of HTTP messages.

Figure 15:
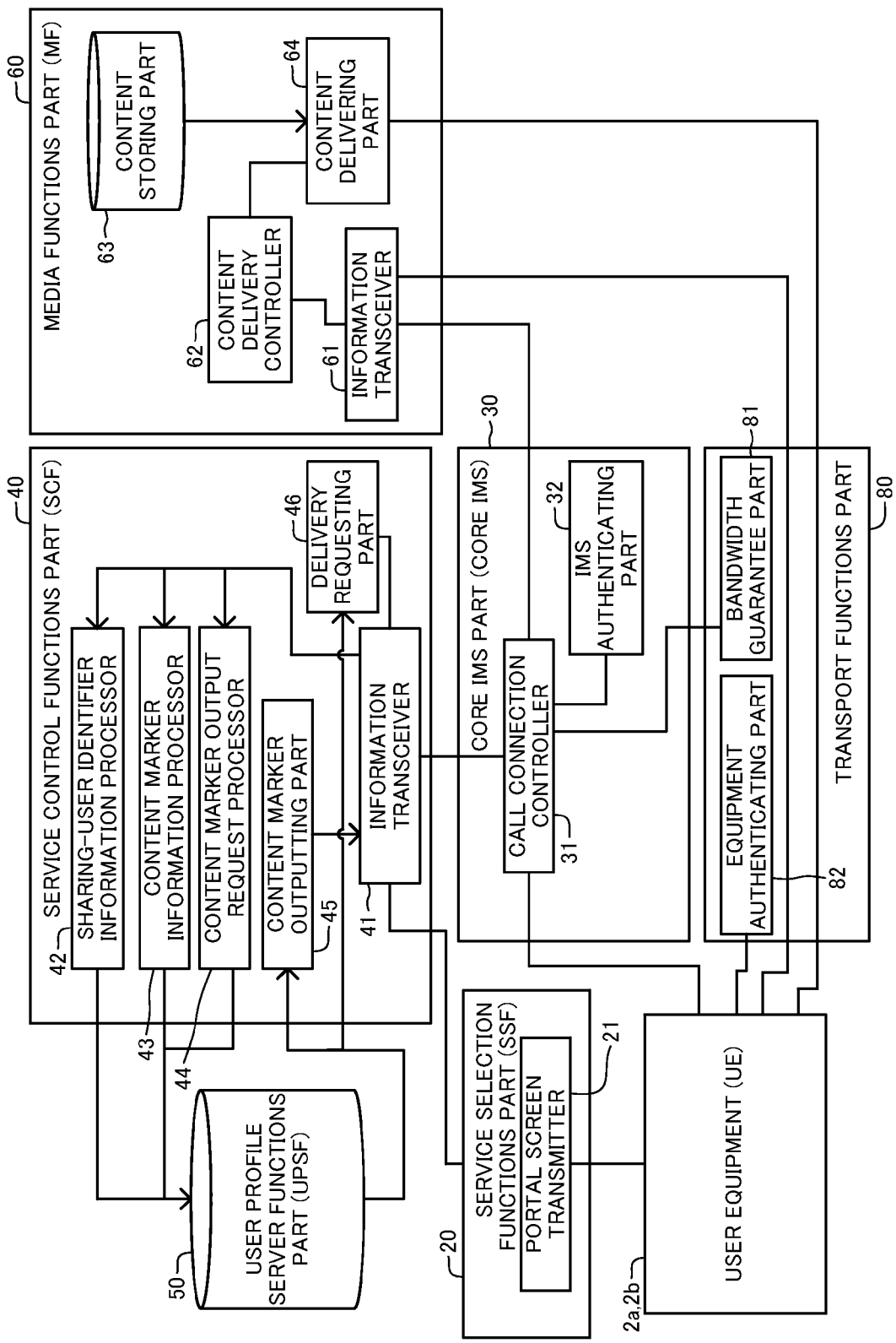
FIG. 15 is a block diagram schematically showing a function of a content delivery system according to a modified example 4 of the first exemplary embodiment.
Figure 16:
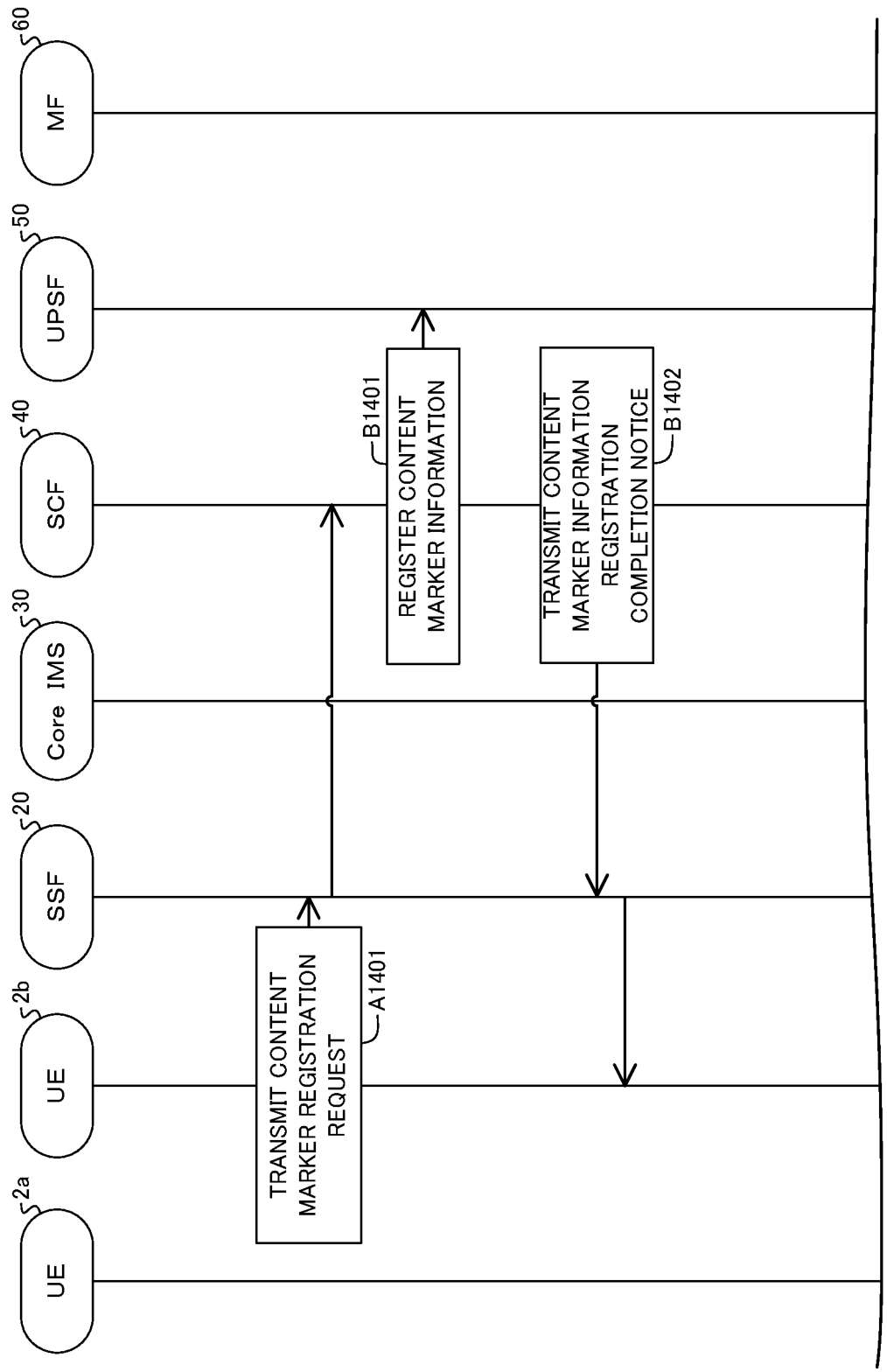
FIG. 16 is a sequence diagram showing an operation of the content delivery system according to the modified example 4 of the first exemplary embodiment when registering content marker information in response to an input by the user of the user equipment.

The information transceiver 41 of this content delivery system 1 transmits a variety of information (requests, instructions, notices, etc.) to the service selection functions part 20 as shown in FIG. 15. Moreover, the information transceiver 41 receives a variety of information transmitted by the service selection functions part 20.

Therefore, for example, in the first exemplary embodiment described above, at step A601 of FIG. 7, the user equipment 2b transmits a content marker registration request to the service control functions part 40 via the Core IMS part 30. On the other hand, in the modified example 4, at step A1401 of FIG. 16, the user equipment 2b transmits a content marker registration request to the service control functions part 40 via the service selection functions part 20.

In a like manner, in the first exemplary embodiment described above, at step B602 of FIG. 7, the service control functions part 40 transmits a content marker information registration completion notice to the user equipment 2b via the Core IMS part 30. On the other hand, in the modified example 4, at step B1402 of FIG. 16, the service control functions part 40 transmits a content marker information registration completion notice to the user equipment 2b via the service selection functions part 20.

Although a content marker registering process has been described as an example herein, other processes are also executed in a like manner.

Further, this modified example 4 can also produce like actions and effects as the first exemplary embodiment described above.

Modified Example 5 of First Exemplary Embodiment

Next, a content delivery system according to a modified example 5 of the first exemplary embodiment of the present invention will be described. The content delivery system according to the modified example 5 is different from the content delivery system according to the first exemplary embodiment in that the portal server 5 is configured to directly perform management of information stored in the user profile server functions part 50. Therefore, a description will be made below focusing on the different point.

The portal server 5 and the service control server 4a in this content delivery system 1 are configured to be capable of communicating with each other. In this exemplary embodiment, the portal server 5 communicates with the service control server 4a by transmission and reception of SIP messages.

Figure 17:
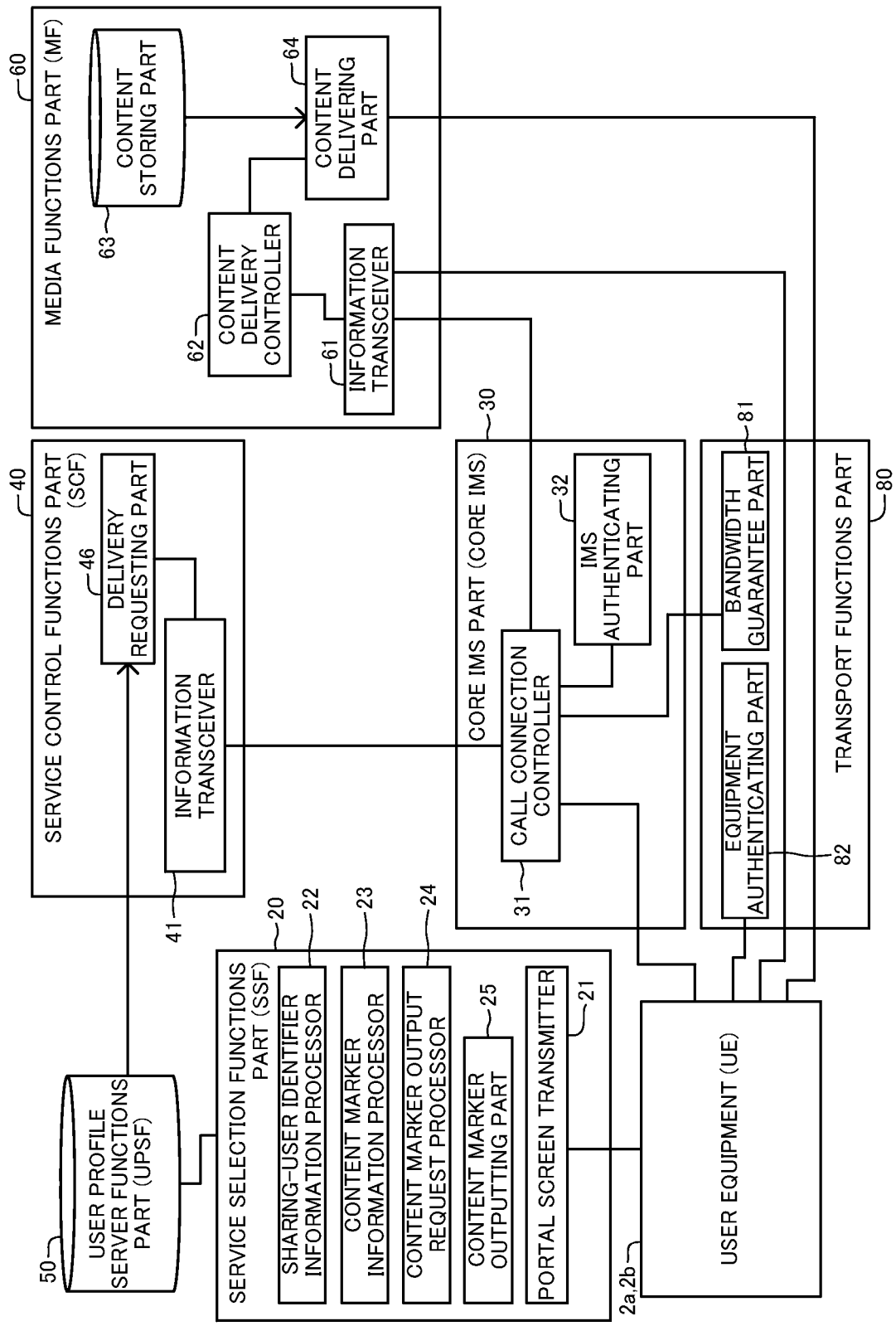
FIG. 17 is a block diagram schematically showing a function of a content delivery system according to a modified example 5 of the first exemplary embodiment.

As shown in FIG. 17, the service selection functions part 20 in this content delivery system 1 includes a sharing-user identifier information processor 22, a content marker information processor 23, a content marker output request processor 24 and a content marker outputting part 25 like the sharing-user identifier information processor 42, the content marker information processor 43, the content marker output request processor 44 and the content marker outputting part 45. On the other hand, the service control functions part 40 does not include the sharing-user identifier information processor 42, the content marker information processor 43, the content marker output request processor 44, or the content marker outputting part 45.

The service selection functions part 20 acquires (reads out) information stored in the user profile server functions part 50. Moreover, the service selection functions part 20 causes the user profile server functions part 50 to newly store information (writes information).

Therefore, for example, in the first exemplary embodiment described above, at step A601 of FIG. 7, the user equipment 2b transmits a content marker registration request to the service control functions part 40 via the Core IMS part 30. Moreover, the service control functions part 40 registers content marker information to the user profile server functions part 50.

Figure 18:
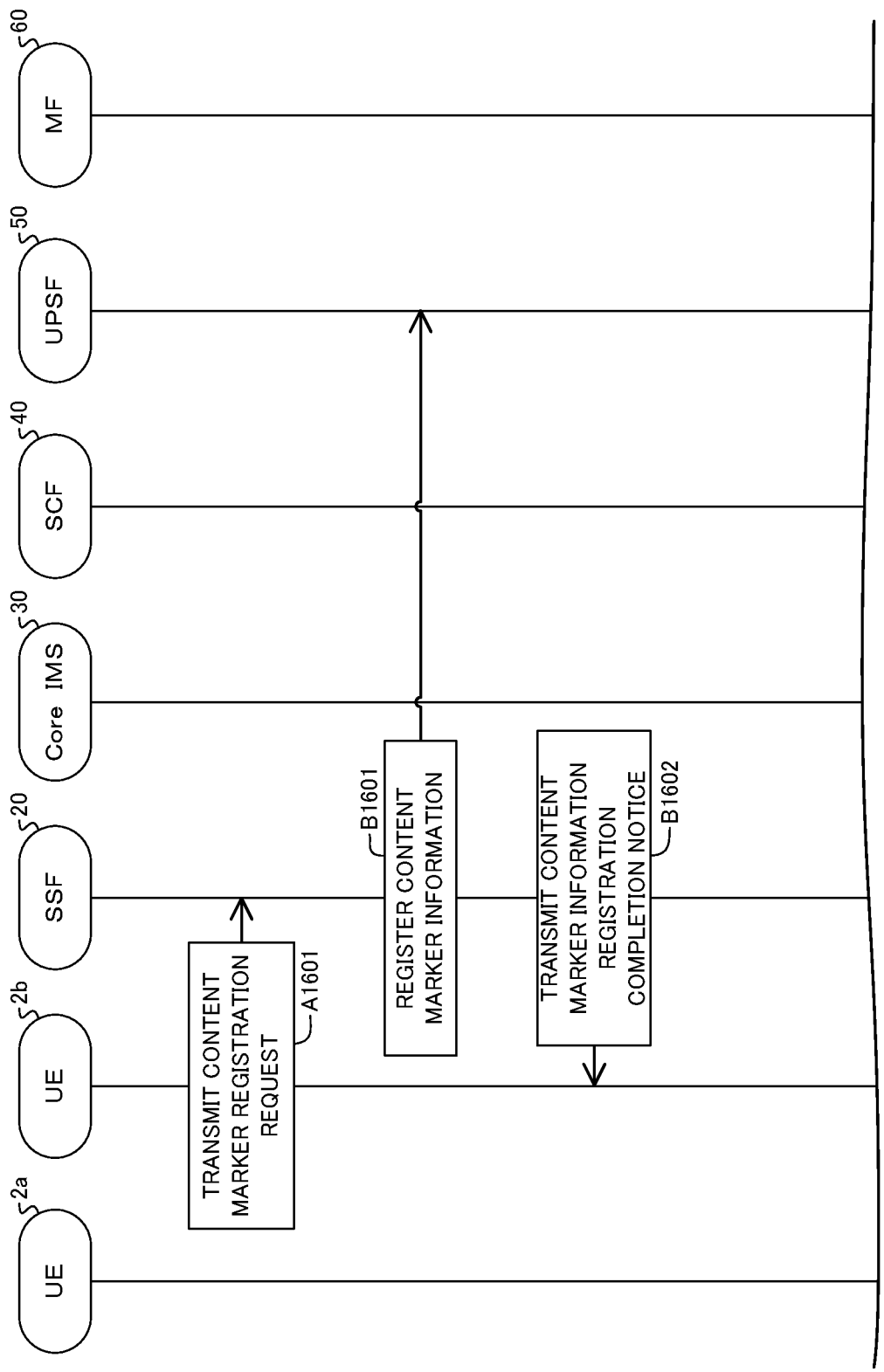
FIG. 18 is a sequence diagram showing an operation of the content delivery system according to the modified example 5 of the first exemplary embodiment when registering content marker information in response to an input by the user of the user equipment.

On the other hand, in the modified example 5, at step A1601 of FIG. 18, the user equipment 2b transmits a content marker registration request to the portal server 5 (the service selection functions part 20). Then, the service selection functions part 20 registers the content marker information to the user profile server functions part 50.

Figure 7:
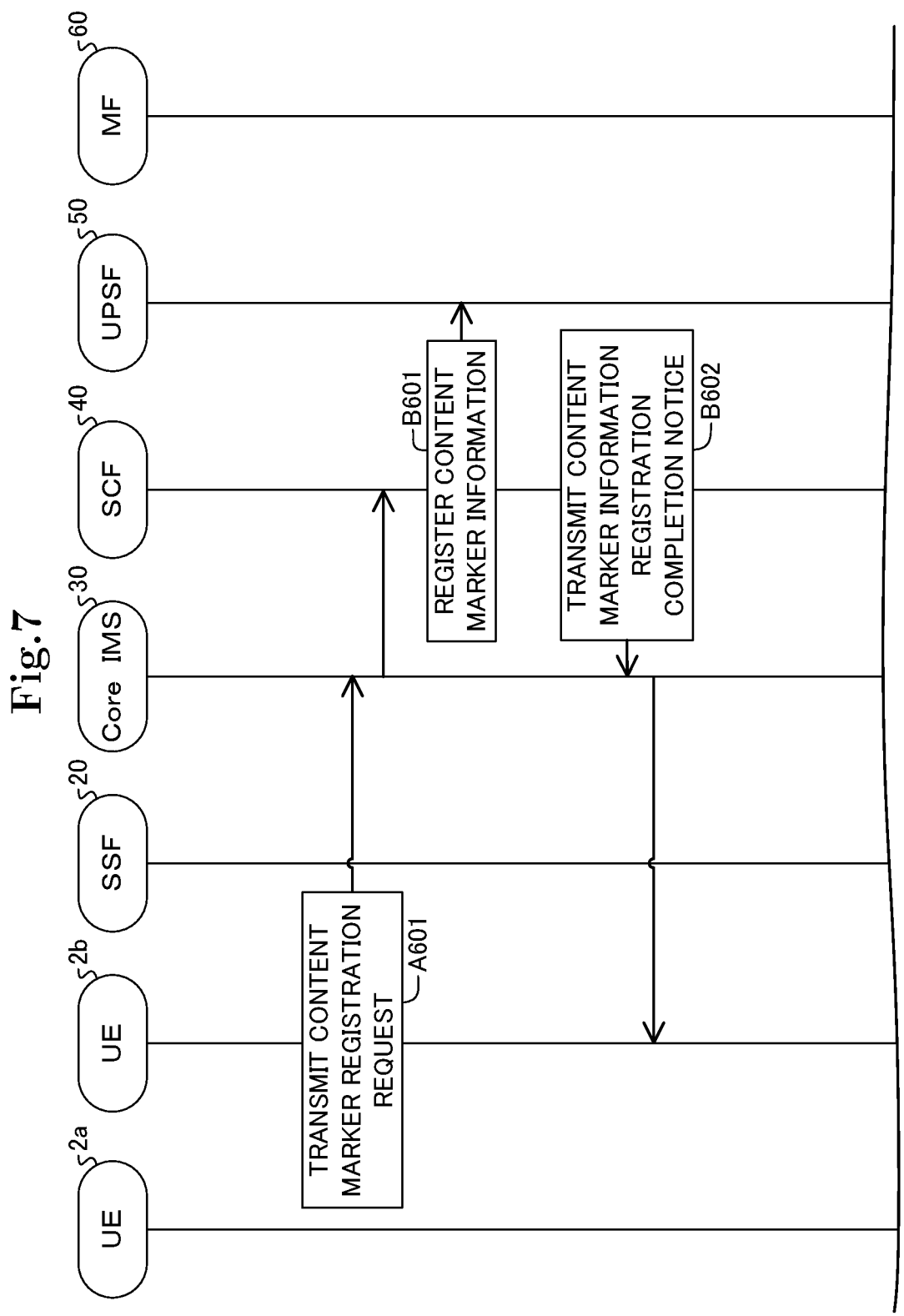
FIG. 7 is a sequence diagram showing an operation of the content delivery system shown in FIG. 1 when registering content marker information in response to an input by the user of the user equipment.

In a like manner, in the first exemplary embodiment, at step B602 of FIG. 7, the service control functions part 40 transmits a content marker information registration completion notice to the user equipment 2b via the Core IMS part 30. On the other hand, in the modified example 5, at step B1602 of FIG. 18, the service selection functions part 20 transmits a content marker information registration completion notice to the user equipment 2b.

Although a content marker registering process has been described here as an example, other processes are also executed in a like manner.

Further, the modified example 5 can also produce like actions and effects as the first exemplary embodiment.

In the modified example 5, the service selection functions part 20 includes all of the sharing-user identifier information processor, the content marker information processor, the content marker output request processor, and the content marker outputting part. In another modified example, the service selection functions part 20 may include part of the sharing-user identifier information processor, the content marker information processor, the content marker output request processor and the content marker outputting part, whereas the service control functions part 40 may include the rest thereof.

Modified Example 6 of First Exemplary Embodiment

Next, a content delivery system according to a modified example 6 of the first exemplary embodiment of the present invention will be described. The content delivery system according to the modified example 6 is different from the content delivery system according to the first exemplary embodiment in that user equipment is configured to output predetermined information as well as not-viewable content marker information. Therefore, a description will be made below focusing on the different point.

Upon reception of content marker information and viewing permission information, the content marker list outputting part 12 outputs not-viewable content marker information and information representing that viewing of content identified by the not-viewable content marker information is prohibited.

To be specific, when the user equipment 2a receives content marker information and viewing permission information, the user equipment 2a outputs an image showing viewable content marker information (in this example, "content marker 1," "content marker 3" and "content marker 4") in bold letters as shown in FIG. 19. Moreover, the user equipment 2a outputs an image showing not-viewable content marker information (in this example, "content marker 2") in light letters and including a message "not viewable."

According to this, it is possible to have the user UA of the user equipment 2a more securely recognize whether the user UA can view content identified by content marker information. As a result, it is possible to increase convenience for the user UA.

The user equipment 2a may be configured to output an image showing not-viewable content marker information in letters having the same thickness as letters representing viewable content marker information. Also in this case, it is possible to say that it corresponds to output of content marker information in a first mode that the user equipment 2a does not output information representing that viewing of content is prohibited when outputting content marker information, and it corresponds to output of content marker information in a second mode that the user equipment 2a outputs information representing that viewing of content is prohibited when outputting content marker information.

Modified Example 7 of First Exemplary Embodiment

Next, a content delivery system according to a modified example 7 of the first exemplary embodiment of the present invention will be described. The content delivery system according to the modified example 7 is different from the content delivery system according to the first exemplary embodiment in that user equipment is configured to output predetermined information as well as not-viewable content marker information. Therefore, a description will be made below focusing on the different point.

Upon reception of content marker information and viewing permission information, the content marker list outputting part 12 outputs not-viewable content marker information and information on a procedure for viewing content identified by the not-viewable content marker information.

To be specific, when the user equipment 2a receives content marker information and viewing permission information, the user equipment 2a outputs an image showing viewable content marker information (in this example, "content marker 1," "content marker 3" and "content marker 4") in bold letters as shown in FIG. 20. Moreover, the user equipment 2a outputs an image showing not-viewable content marker information (in this example, "content marker 2") in light letters and including a message "viewable by plan B."

According to this, it is possible to further increase convenience for the user UA of the user equipment 2a and the operator of the content delivery system 1.

The user equipment 2a may be configured to output an image showing not-viewable content marker information in letters having the same thickness as letters representing viewable content marker information. Also in this case, it is possible to say that it corresponds to output of content marker information in a first mode that the user equipment 2a does not output information on a procedure for viewing content when outputting content marker information, and it corresponds to output of content marker information in a second mode that the user equipment 2a outputs information on a procedure for viewing content when outputting content marker information.

Modified Example 8 of First Exemplary Embodiment

Next, a content delivery system according to a modified example 8 of the first exemplary embodiment of the present invention will be described. The content delivery system according to the modified example 8 is different from the content delivery system according to the first exemplary embodiment in that user equipment is configured not to output not-viewable content marker information. Therefore, a description will be made below focusing on the different point.

The content marker list outputting part 12 outputs content marker information (viewable content marker information) associated with viewing permission information representing permission of transmission of content data to the user equipment 2a, 2b, among the received content marker information. On the other hand, the content marker list outputting part 12 does not output content marker information (not-viewable content marker information) associated with viewing permission information representing non-permission of transmission of content data to the user equipment 2a, 2b, among the received content marker information.

According to this, it is possible to prevent the user UA, UB of the user equipment 2a, 2b from uselessly selecting content marker information on not-viewable content. As a result, it is possible to increase convenience for the user UA, UB.

Modified Example 9 of First Exemplary Embodiment

Next, a content delivery system according to a modified example 9 of the first exemplary embodiment of the present invention will be described. The content delivery system according to the modified example 9 is different from the content delivery system according to the first exemplary embodiment in that the service control functions part 40 is configured not to transmit not-viewable content marker information to the user equipment 2a, 2b. Therefore, a description will be made below focusing on the different point.

The content marker outputting part 45 specifies a content marker table and a viewing authority table that are stored in association with user identifier information identical to the user identifier information included in the content marker output request accepted by the content marker output request processor 44. Then, the content marker outputting part 45 acquires content marker information included in the specified content marker table.

Further, for each of the acquired content marker information, the content marker outputting part 45 specifies viewing authority information including content identifier information included in the content marker information, from among viewing authority information included in the specified viewing authority table, and acquires viewing permission information included in the specified viewing authority information.

Furthermore, the content marker outputting part 45 outputs content marker information having been the basis of acquisition of viewing permission information representing permission of transmission of content data to the user equipment 2a, among the acquired content marker information.

That is to say, the content marker outputting part 45 extracts content marker information stored in association with user identifier information identical to the user identifier information included in the content marker output request, and outputs content marker information including content identifier information stored in association with viewing permission information representing permission of transmission of content data to the user equipment 2a and the user identifier information, among the extracted content marker information.

Then, the information transceiver 41 transmits the content marker information outputted by the content marker outputting part 45 to the user equipment 2a, 2b having transmitted the content marker output request.

The content marker list outputting part 12 receives content marker information and outputs the received content marker information.

According to this, it is possible to prevent the content delivery system 1 from uselessly transmitting content marker information. As a result, it is possible to decrease communication load for transmission of content marker information.

Second Exemplary Embodiment

Next, a content delivery system according to a second exemplary embodiment of the present invention will be described. The content delivery system according to the second exemplary embodiment is different from the content delivery system according to the first exemplary embodiment in that the user profile server functions part 50 does not store sharing-user tables and sharing-user identifier information is included in content marker registration information. Therefore, a description will be made below focusing on the different point.

The user profiles server functions part 50 of the second exemplary embodiment stores a content marker table and a viewing authority table in association with user identifier information in a like manner as in the first exemplary embodiment. On the other hand, unlike in the first exemplary embodiment, the user profile server functions part 50 does not store a sharing-user table. A content marker table and/or a viewing authority table may be stored in the service control functions part 40. Moreover, a content marker table and/or a viewing authority table may be stored into another storing device that can be read and written by the service control functions part 40.

A content marker table is a table including a plurality of content marker registration information. Unlike in the first exemplary embodiment, content marker registration information is composed of content marker information, content marker identifier information for identifying the content marker information, and sharing-user identifier information for identifying a user/users who shares/share the content marker information (Authorized User or Authorized View User). Here, content marker information includes content identifier information for identifying content, a playing start position representing a position to start playing the content, and a playing finish position representing a position to finish playing the content.

Content marker registration information may include a plurality of sharing-user identifier information, or may include only empty information as sharing-user identifier information. In a case that content marker registration information includes only empty information as sharing-user identifier information, it is represented that there is no user sharing content marker information.

Further, although all the information composing content marker registration information is stored in one table (content marker table) in this exemplary embodiment, the information composing content marker registration information may be spread and stored in a plurality of tables in a modified example of this exemplary embodiment. For example, information composed of a pair of content marker information and content marker identifier information may be stored in a content marker basic table, and information composed of a pair of sharing-user identifier information and content marker identifier information may be stored in a content marker sharing table.

Also in this case, each of the content marker basic table and the content marker sharing table may be stored in any of the service control functions part 40, the user profile server functions part 50, and another storing device that can be read and written by the service control functions part 40.

Further, as shown in FIG. 21, the service control functions part 40 includes a content marker registration request accepting part (a content marker registration request accepting means (a content marker information accepting means and a sharing-user identifier information accepting means)) 47, and a content marker information storing processor (a content marker information storing processing means) 48, instead of the sharing-user identifier information processor 42 and the content marker information processor 43 of the first exemplary embodiment.

The content marker registration request accepting part 47 accepts a content marker registration request as a process request received by the information transceiver 41. A content marker registration request includes content marker information, user identifier information for identifying the user of the user equipment 2a, 2b having transmitted the content marker information, and sharing-user identifier information for identifying a user/users who shares/share the content marker information.

The content marker information storing processor 48 updates the content marker table stored in the user profile server functions part 50 based on the content marker registration request accepted by the content marker registration request accepting part 47.

To be specific, when the content marker registration request accepting part 47 accepts the content marker registration request, the content marker information storing processor 48 generates content marker identifier information. Then, the content marker information storing processor 48 adds content marker registration information composed of the content marker information and sharing-user identifier information included in the content marker registration request and the generated content marker identifier information, to a content marker table stored in association with the user identifier information included in the accepted content marker registration request.

That is to say, the content marker information storing processor 48 executes a process of causing the user profile server functions part 50 to store the content marker information, user identifier information and sharing-user identifier information included in the content marker registration request in association with one another.

Further, the content marker outputting part 45 specifies a content marker table and a viewing authority table that are stored in association with user identifier information identical to user identifier information included in a content marker output request accepted by the content marker output request processor 44. The content marker outputting part 45 extracts content marker information included in the specified content marker table. That is to say, the content marker outputting part 45 extracts content marker information stored in association with user identifier information identical to the user identifier information included in the accepted content marker output request.

Further, the content marker outputting part 45 extracts content marker registration information including sharing-user identifier information identical to the user identifier information included in the content marker output request accepted by the content marker output request processor 44, from all the content marker registration information stored in the user profile server functions part 50. Then, the content marker outputting part 45 acquires content marker information included in the extracted content marker registration information. That is to say, the content marker outputting part 45 extracts content marker information stored in association with sharing-user identifier information identical to the user identifier information included in the accepted content marker output request.

Thus, the content marker outputting part 45 extracts content marker information stored in association with user identifier information or sharing-user identifier information that is identical to the user identifier information included in the accepted content marker output request.

Then, for each of the extracted content marker information, the content marker outputting part 45 specifies viewing authority information including content identifier information included in the content marker information from among viewing authority information included in the specified viewing authority table, and acquires viewing permission information included in the specified viewing authority information. Then, the content marker outputting part 45 outputs information in which the acquired content marker information and the acquired viewing permission information are associated one by one.

That is to say, the content marker outputting part 45 extracts content marker information stored in association with user identifier information or sharing-user identifier information that is identical to the user identifier information included in the content marker output request and, for each of the extracted content marker information, acquires viewing permission information stored in association with the content identifier information included in the content marker information and the user identifier information, and outputs the content marker information and the acquired viewing permission information in association with each other.

(Operation: Sharing-User Editing Process)

Further, the content delivery system 1 according to the second exemplary embodiment is configured to edit (add, change, or delete) a user/users who shares/share content marker information having been already registered, in response to an input by the user of the user equipment 2a, 2b.

Below, an operation of the content delivery system 1 when the content delivery system 1 changes a user/users who shares/share content marker information in response to an input by the user UB of the user equipment 2b will be described with reference to a sequence diagram of FIG. 17.

In a state that a list of content marker information is displayed on the television, the user UB of the user equipment 2b selects content marker information, and inputs content marker identifier information for identifying the selected content marker information, and sharing-user identifier information as information for identifying a user with who the user UB wants to newly share the content marker information (i.e., sharing-user identifier information after change).

Consequently, the user equipment 2b transmits a content marker edition request as a process request including the inputted content marker identifier information, user authentication success information as user identifier information for identifying the user UB, equipment address information and the sharing-user identifier information after change, to the service control functions part 40 via the Core IMS part 30 (step A1801).

Consequently, the service control functions part 40 receives the content marker edition request. Next, the service control functions part 40 specifies a content marker table stored in association with the user identifier information included in the received content marker edition request, among the content marker tables stored in the user profile server functions part 50.

Then, the service control functions part 40 specifies content marker registration information stored in association with the content marker identifier information included in the received content marker edition request, among content marker registration information stored in the specified content marker table. Moreover, the service control functions part 40 changes sharing-user identifier information included in the specified content marker registration information to the sharing-user identifier information after change included in the received content marker edition request (step B1801).

Then, the service control functions part 40 transmits a content marker edition completion notice to the user equipment 2b via the Core IMS part 30 (step B1802). A content marker edition completion notice is a notice representing that edition of content marker registration information has been completed. Then, upon reception of the content marker edition completion notice, the user equipment 2b causes the not-shown television to display an image representing that edition of the content marker registration information has been completed.

Figure 5:
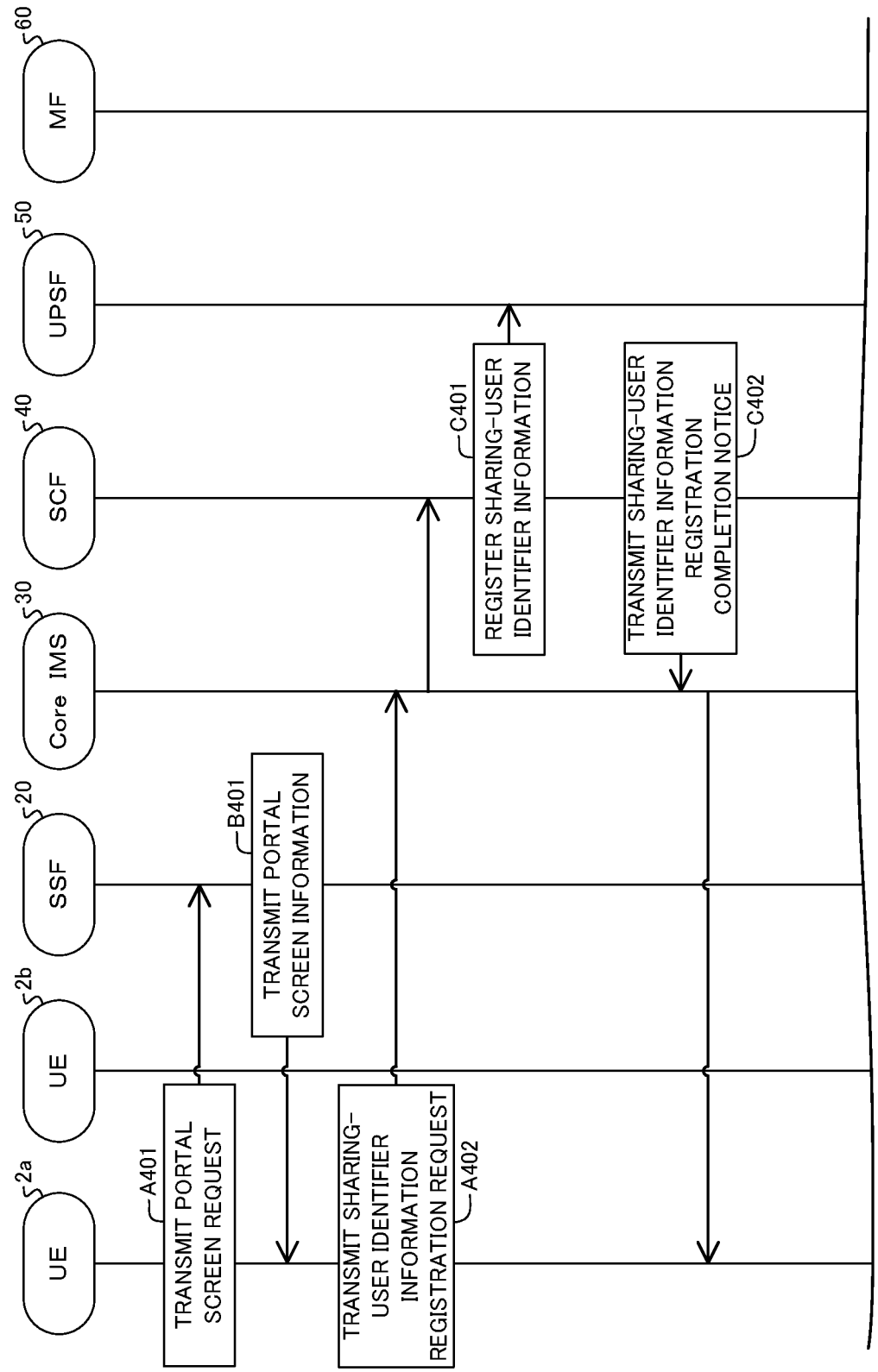
FIG. 5 is a sequence diagram showing an operation of the content delivery system shown in FIG. 1 when registering sharing-user identifier information in response to an input by the user of the user equipment.

The content delivery system 1 configured as described above operates in a like manner as the content delivery system 1 according to the first exemplary embodiment. Unlike in the first exemplary embodiment, the operation of the content delivery system according to the second exemplary embodiment does not include an operation of previously registering sharing-user identifier information for identifying a user/users who shares/share content marker information (FIG. 5).

This second exemplary embodiment can also produce like actions and effects as the first exemplary embodiment.

In a modified example of the second exemplary embodiment, sharing-user identifier information may include sharing-group identifier information for identifying a group including a plurality of users. In this case, it is preferred that the user profile server functions part 50 stores sharing-group identifier information and user identifier information for identifying each of the users included in the group identified with the sharing-group identifier information in association with each other.

Further, in the second exemplary embodiment, the content marker outputting part 45 is configured to extract content marker registration information including sharing-user identifier information identical to user identifier information included in a content marker output request among all the content marker registration information stored in the user profile server functions part 50, and acquire content marker information included in the extracted content marker registration information.

In a modified example of the second exemplary embodiment, the service control functions part 40 may be configured to store user identifier information and user identifier information (sharing-permitted-user identifier information (Source User)) associated with a content marker table including content marker registration information including sharing-user identifier information identical to the aforementioned user identifier information in association with each other. In this case, the content marker outputting part 45 is configured to acquire sharing-permitted-user identifier information associated with user identifier information included in a content marker output request, and acquire content marker registration information included in a content marker table associated with user identifier information identical to the acquired sharing-permitted-user identifier information. Moreover, the content marker outputting part 45 is configured to extract content marker registration information including sharing-user identifier information identical to user identifier information included in the content marker output request among the acquired content marker registration information, and acquire content marker information included in the extracted content marker registration information.

According to this modified example, as compared with extracting content marker registration information including sharing-user identifier information identical to user identifier information included in a content marker output request from all the content marker registration information stored in the user profile server functions part 50, it is possible to reduce processing load on the service control functions part 40, and also possible to extract content marker registration information at higher speeds.

Third Exemplary Embodiment

Next, a content delivery system according to a third exemplary embodiment of the present invention will be described. The content delivery system according to the third exemplary embodiment is different from the content delivery system 1 according to the second exemplary embodiment in that a sharing-user table including sharing-user identifier information as a default value of sharing-user identifier information included in content marker registration information is stored in the user profile server functions part 50. Therefore, a description will be made below focusing on the different point.

Unlike in the second exemplary embodiment described above, the user profile server functions part 50 according to the third exemplary embodiment stores a sharing-user table in association with user identifier information. Moreover, the user profile server functions part 50 stores a viewing authority table in association with user identifier information as in the second exemplary embodiment. Moreover, the service control functions part 40 stores a content marker table in association with user identifier information. Each of the content marker table, the sharing-user table and the viewing authority table may be stored in any of the service control functions part 40, the user profile server functions part 50, and another storing device that can be read and written by the service control functions part 40.

A content marker table is a table including a plurality of content marker registration information. As in the second exemplary embodiment, content marker registration information is composed of content marker information, content marker identifier information for identifying the content marker information, and sharing-user identifier information for identifying a user/users who shares/share the content marker information. Here, content marker information includes content identifier information for identifying content, a playing start position representing a position to start playing the content, and a playing finish position representing a position to finish playing the content. Content marker registration information may include a plurality of sharing-user identifier information, or may include only empty information as sharing-user identifier information. In a case that content marker registration information includes only empty information as sharing-user identifier information, it is represented that there is no user sharing content marker information.

Further, a sharing-user table is a table including sharing-user identifier information for identifying a user/users who shares/share content marker information (Authorized User or Authorized View User). A sharing-user table may include one piece of sharing-user identifier information, or may include a plurality of sharing-user identifier information. In a case that a sharing-user table does not include sharing-user identifier information (includes only empty information), it is represented that there is no user sharing content marker information.

The content marker information processor 43 accepts a content marker registration request as a process request received by the information transceiver 41. A content marker registration request includes sharing permission information, content marker information, and user identifier information for identifying the user of the user equipment 2a, 2b. Then, the content marker information processor 43 updates a content marker table stored in the service control functions part 40 based on the accepted content marker registration request.

To be specific, the content marker information processor 43 specifies a content marker table stored in association with the user identifier information included in the content marker registration request, among the content marker tables stored in the service control functions part 40.

Further, in a case that the sharing permission information included in the content marker registration request represents permission of sharing of the content marker information with another user, the content marker information processor 43 specifies a sharing-user table stored in association with the user identifier information included in the content marker registration request among the sharing-user tables stored in the user profile server functions part 50.

Furthermore, the content marker information processor 43 acquires the sharing-user identifier information included in the specified sharing-user table. Then, the content marker information processor 43 generates content marker identifier information. Moreover, the content marker information processor 43 adds content marker registration information, which is composed of the content marker information included in the content marker registration request, the generated content marker identifier information and the acquired sharing-user identifier information, to the specified content marker table.

That is to say, in a case that the sharing permission information included in the accepted content marker registration request represents permission of sharing of content marker information with another user, the content marker information processor 43 executes a process of causing the service control functions part 40 to store the content marker information and user identifier information included in the content marker registration request, in association with each other.

In a case that sharing permission information included in a content marker registration request represents that sharing content marker information with another user, and/or in a case that sharing-user identifier information is not included in a sharing-user table associated with user identifier information included in a content marker registration request, the content marker information processor 43 generates content marker identifier information. Moreover, the content marker information processor 43 adds content marker registration information, which is composed of the content marker information included in the content marker registration request, the generated content marker identifier information, and empty information as sharing-user identifier information, to the specified content marker table.

That is to say, in a case that sharing permission information included in the accepted content marker registration request represents that it is not permitted to share content marker information with another user, the content marker information processor 43 executes a process of causing the service control functions part 40 to store content marker information and user identifier information included in the content marker registration request in association with each other.

Further, the content marker outputting part 45 specifies a content marker table and a viewing authority table that are stored in association with user identifier information identical to the user identifier information included in the content marker output request accepted by the content marker output request processor 44. The content marker outputting part 45 extracts content marker information included in the specified content marker table. That is to say, the content marker outputting part 45 extracts content marker information stored in association with user identifier information identical to the user identifier information included in the accepted content marker output request.

Furthermore, the content marker outputting part 45 extracts content marker registration information including sharing-user identifier information identical to the user identifier information included in the content marker output request accepted by the content marker output request processor 44 from all the content marker registration information stored in the service control functions part 40. Then, the content marker outputting part 45 acquires content marker information included in the extracted content marker registration information. That is to say, the content marker outputting part 45 extracts content marker information stored in association with sharing-user identifier information identical to the user identifier information included in the accepted content marker output request.

Thus, the content marker outputting part 45 extracts content marker information stored in association with user identifier information or sharing-user identifier information identical to the user identifier information included in the accepted content marker output request.

Then, for each of the extracted content marker information, the content marker outputting part 45 specifies viewing authority information including content identifier information included in the content marker information from among viewing authority information included in the specified viewing authority table, and acquires viewing permission information included in the specified viewing authority information. Then, the content marker outputting part 45 outputs information in which the acquired content marker information and the acquired viewing permission information are associated one by one.

That is to say, the content marker outputting part 45 extracts content marker information stored in association with user identifier information or sharing-user identifier information that is identical to the user identifier information included in the content marker output request and, for each of the extracted content marker information, acquires viewing permission information stored in association with the content identifier information included in the content marker information and the user identifier information, and outputs the content marker information and the acquired viewing permission information in association with each other.

The content delivery system 1 configured as described above operates in a like manner as the content delivery system 1 of the first embodiment.

This third exemplary embodiment can also produce like actions and effects as in the first exemplary embodiment.

Further, according to the third exemplary embodiment, sharing-user identifier information registered in the sharing-user table is used as a default value of the sharing-user identifier information included in the content marker registration information, and therefore, it is possible to save time to input user identifier information every time the user transmits a content marker registration request. That is to say, it is possible to increase the convenience of the users.

Fourth Exemplary Embodiment

Next, a content delivery system according to a fourth exemplary embodiment of the present invention will be described with reference to FIG. 23.

A content delivery system 100 according to the fourth exemplary embodiment has a content marker information accepting part (a content marker information accepting means) 101, a content marker information storing processor (a content marker information storing processing means) 102, a sharing-user identifier information accepting part (a sharing-user identifier information accepting means) 103, a content marker output request accepting part (a content marker output request accepting means) 104, a content marker transmitter (a content marker transmitting means) 105, a content transmitter (a content transmitting means) 106, a viewing permission information storing part (a viewing permission information storing means) 107, and a content transmission prohibiting part (a content transmission prohibiting means) 108.

The content marker information accepting part 101 accepts content marker information including content identifier information for identifying content.

The content marker information storing processor 102 executes a process of causing a storing device RC to store the content marker information accepted by the content marker information accepting part 101.

The sharing-user identifier information accepting part 103 accepts sharing-user identifier information for identifying a user/users who shares/share the content marker information stored in the storing device RC.

The content marker output request accepting part 104 accepts a content marker output request transmitted by the user equipment 2a, including user identifier information for identifying the user and requesting an output of content marker information, by receiving the content marker output request.

Based on user identifier information included in the content marker output request accepted by the content marker output request accepting part 104 and sharing-user identifier information accepted by the sharing-user identifier information accepting part 103, the content marker transmitter 105 extracts content marker information corresponding to the user identifier information from the content marker information stored in the storing device RC. Moreover, the content marker transmitter 105 transmits the extracted content marker information to the user equipment having transmitted the content marker output request.

In the case of receiving a content transmission request transmitted by the user equipment 2a and including content identifier information included in the content marker information and user identifier information for identifying the user UA of the user equipment 2a, the content transmitter 106 transmits content data representing content identified by the content identifier information to the user equipment 2a.

The viewing permission information storing part 107 causes the storing device RC to store user identifier information, content identifier information and viewing permission information representing whether to permit transmission of content data to the user equipment 2a in association with one another.

In a case that viewing permission information stored in association with the user identifier information and the content identifier information that are included in the content transmission request represents non-permission of transmission of content data to the user equipment 2a, the content transmission prohibiting part 108 prohibits transmission of the content data by the content transmitter 106.

According to this, in the case of accepting a content marker output request from the user UA (a first user), the content delivery system 100 can transmit content marker information set to share with the user UA among content marker information registered by the user UB (another user), to the user equipment 2a used by user UA. As a result, it is possible to allow only the user UA to view the content marker information registered by the user UB other than the user UA. That is to say, it is possible to increase convenience for the users UA and UB.

Furthermore, the user equipment 2a transmits a content transmission request including content identifier information included in the received content marker information (i.e., requests content based on the content marker information), thereby being capable of receiving content data identified by the content identifier information. Therefore, the user UA of the user equipment 2a can view content that the user UA of the user equipment 2a wants to view without performing a cumbersome operation for specifying the content. As a result, it is possible to increase convenience for the user UA.

In addition, the content delivery system 100 prohibits transmission of content data associated with viewing permission information representing non-permission of transmission of content data to user equipment (e.g., the user equipment 2a). Therefore, by properly setting viewing permission information, the content delivery system 100 can transmit content data requested based on content marker information only to user equipment (e.g., user equipment 2a) of a specific user. As a result, it is possible to allow only a specific user (e.g., the user UA) to view content requested based on content marker information.

In this case, it is preferred that the content delivery system includes an application server system and a connection control system, the connection control system is configured to receive equipment specification information transmitted by the user equipment, and establish a connection between the application server system and the user equipment based on the received equipment specification information, and the content transmitting means is configured to transmit the content data to the user equipment in a case that the connection between the user equipment and the application server system is established by the connection control system.

In this case, it is preferred that: the connection control system is configured to receive user authenticating information transmitted by the user equipment and inputted by the user of the user equipment; the content delivery system has a user authenticating criterion information storing means configured to previously store user authenticating criterion information and a user authenticating means configured to determine whether or not the user authenticating information received by the connection control system corresponds to the user authenticating criterion information stored by the user authenticating criterion information storing means, thereby determining whether the user having inputted the user authenticating information is a valid user or not; and the content marker output request accepting means is configured to accept the content marker output request including user identifier information for identifying the user determined as a valid user by the user authenticating means.

According to this, the content delivery system accepts a content marker output request including user identifier information for identifying a user authenticated as a valid user. Consequently, it is possible to prevent the content delivery system from executing a process based on a content marker output request transmitted by a user who is not authenticated as a valid user. As a result, it is possible to prevent an invalid user from viewing content marker information.

In this case, it is preferred that: the content marker transmitting means is configured to, for each of the extracted content marker information, acquire the viewing permission information stored in association with the user identifier information included in the accepted content marker output request and the content identifier information included in the content marker information, and transmit the content marker information and the acquired viewing permission information in association with each other to the user equipment having transmitted the content marker output request; and the user equipment includes a content marker list outputting means configured to receive the content marker information and the viewing permission information, and output content marker information associated with viewing permission information representing permission of transmission of the content data to the user equipment among the received content marker information, in a first mode, whereas output content marker information associated with viewing permission information representing non-permission of transmission of the content data to the user equipment among the received content marker information, in a second mode.

According to this, it is possible to have a user of user equipment recognize whether the user can view content identified by content marker information. As a result it is possible to increase convenience for the user.

In this case, it is preferred that the content marker list outputting means is configured to output content marker information associated with viewing permission information representing non-permission of transmission of the content data to the user equipment among the received content marker information, and information representing that viewing of content identified by the content marker information is prohibited.

According to this, it is possible to have a user of user equipment more securely recognize whether the user can view content identified by content marker information. As a result, it is possible to increase convenience for the user.

In this case, it is preferred that the content marker list outputting means is configured to output content marker information associated with viewing permission information representing non-permission of transmission of the content data to the user equipment among the received content marker information, and information on a procedure for viewing content identified by the content marker information.

According to this, it is possible to further increase convenience for a user of user equipment and an operator of the content delivery system.

Further, in another aspect of the content delivery system:

the content marker transmitting means is configured to, for each of the extracted content marker information, acquire the viewing permission information stored in association with the user identifier information included in the accepted content marker output request and the content identifier information included in the content marker information, and transmit the content marker information and the acquired viewing permission information in association with each other to the user equipment having transmitted the content marker output request; and the user equipment includes a content marker list outputting means configured to receive the content marker information and the viewing permission information, and output content marker information associated with viewing permission information representing permission of transmission of the content data to the user equipment among the received content marker information, whereas not output content marker information associated with viewing permission information representing non-permission of transmission of the content data to the user equipment among the received content marker information.

According to this, it is possible to prevent a user of user equipment from uselessly selecting content marker information relating to not-viewable content. As a result, it is possible to increase convenience for the user.

Further, in another aspect of the content delivery system:

the content marker transmitting means is configured to, among the extracted content marker information, transmit content marker information that includes content identifier information stored in association with the user identifier information included in the accepted content marker output request and viewing permission information representing permission of transmission of the content data to the user equipment, to the user equipment having transmitted the content marker output request; and the user equipment includes a content marker list outputting means configured to receive the content marker information and output the received content marker information.

According to this, it is possible to prevent the content delivery system from uselessly transmitting content marker information. As a result, it is possible to decrease communication load for transmitting content marker information.

In this case, it is preferred that:

the content delivery system includes a sharing-user identifier information storing processing means configured to execute a process of causing the storing device to store the accepted sharing-user identifier information and user identifier information for identifying a user of user equipment having transmitted the sharing-user identifier information in association with each other;

the content marker information accepting means is configured to accept a content marker registration request that includes sharing permission information representing whether to permit sharing of content marker information with another user, the content marker information, and user identifier information for identifying a user of user equipment having transmitted the content marker information;

the content marker information storing processing means is configured to execute the process of causing the storing device to store the content marker information and the user identifier information that are included in the accepted content marker registration request in association with each other and, in a case that the sharing permission information included in the content marker registration request represents permission of sharing of content marker information with another user, further causing the storing device to store user identifier information identical to sharing-user identifier information stored in association with the user identifier information included in the accepted content marker registration request and the content marker information in association with each other; and the content marker transmitting means is configured to extract content marker information stored in association with user identifier information identical to the user identifier information included in the accepted content marker output request.

Further, it is preferred that:

the content delivery system according to another aspect of the present invention has a content marker registration request accepting means, which is a means composing the content marker information accepting means and the sharing-user identifier information accepting means and which is a means configured to accept a content marker registration request including content marker information, user identifier information for identifying a user of user equipment having transmitted the content marker information and the sharing-user identifier information; the content marker information storing processing means is configured to execute the process of causing the storing device to store the content marker information, the user identifier information and the sharing-user identifier information that are included in the accepted content marker registration request in association with one another; and the content marker transmitting means is configured to extract content marker information stored in association with user identifier information or sharing-user identifier information that is identical to the user identifier information included in the accepted content marker output request.

Further, it is preferred that:

the content delivery system according to another aspect of the present invention has a sharing-user identifier information storing processing means configured to execute a process of causing the storing device to store the accepted sharing-user identifier information and user identifier information for identifying a user of user equipment having transmitted the sharing-user identifier information in association with each other;

the content marker information accepting means is configured to accept a content marker registration request that includes sharing permission information representing whether to permit sharing of content marker information with another user, the content marker information, and user identifier information for identifying a user of user equipment having transmitted the content marker information;

the content marker information storing processing means is configured to execute the process of, in a case that the sharing permission information included in the accepted content marker registration request represents non-permission of sharing of content marker information with another user, causing the storing device to store the content marker information and the user identifier information that are included in the content marker registration request in association with each other, whereas, in a case that the sharing permission information represents permission of sharing of content marker information with another user, causing the storing device to store the content marker information and the user identifier information that are included in the content marker registration request, and sharing-user identifier information stored in association with the user identifier information, in association with each other; and the content marker transmitting means is configured to extract content marker information stored in association with user identifier information or sharing-user identifier information that is identical to the user identifier information included in the accepted content marker output request.

Further, a content delivery system of another exemplary embodiment of the present invention includes an application server system and a connection control system.

The connection control system includes a Core IMS (Internet Protocol Multimedia Subsystem) part configured to receive equipment specification information transmitted by user equipment and establish a connection between the application server system and the user equipment based on the received equipment specification information.

The application server system includes: a media functions part configured to transmit content data representing content to the user equipment with the connection established by the connection control system; a service control functions part configured to control a service provided by the media functions part; and a user profile server functions part configured to store profile information of a user of the user equipment.

The application server system further includes: a content marker information accepting means configured to receive content marker information, which is information transmitted by the user equipment and which is information including content identifier information for identifying content, via the Core IMS part, thereby accepting the content marker information; a content marker information storing processing means configured to execute a process of causing the user profile server functions part or the service control functions part to store the accepted content marker information; a sharing-user identifier information accepting means configured to receive sharing-user identifier information, which is information transmitted by the user equipment and which is information for identifying a user/users who shares/share the stored content marker information, via the Core IMS part, thereby accepting the sharing-user identifier information; a content marker output request accepting means configured to receive a content marker output request, which is information transmitted by the user equipment and which is information including user identifier information for identifying a user and requesting for an output of content marker information, via the Core IMS part, thereby accepting the content marker output request; a content marker transmitting means configured to, based on the user identifier information included in the accepted content marker output request and the accepted sharing-user identifier information, extract content marker information corresponding to the user identifier information from the stored content marker information, and transmit the extracted content marker information to the user equipment having transmitted the content marker output request via the Core IMS part; a content transmitting means configured to, in the case of receiving a content transmission request, which is transmitted by the user equipment and which includes the content identifier information included in the content marker information and user identifier information for identifying a user of the user equipment, transmit content data representing content identified by the content identifier information to the user equipment; a viewing permission information storing means configured to store the user identifier information, the content identifier information and viewing permission information representing whether to permit transmission of the content data to the user equipment in association with one another; and a content transmission prohibiting means configured to, in a case that the viewing permission information stored in association with the user identifier information and the content identifier information that are included in the content transmission request represents non-permission of transmission of the content data to the user equipment, prohibit transmission of the content data by the content transmitting means.

In this case, it is preferred that in the content delivery system:

the Core IMS part is configured to receive user authenticating information transmitted by the user equipment and inputted by the user of the user equipment;

the Core IMS part or the user profile server functions part has a user authenticating criterion information storing means configured to previously store user authenticating criterion information;

the Core IMS part or the service control functions part has a user authenticating means configured to determine whether or not the user authenticating information received by the connection control system corresponds to the user authenticating criterion information stored by the user authenticating criterion information storing means, thereby determining whether the user having inputted the user authenticating information is a valid user or not; and the content marker output request accepting means is configured to accept the content marker output request including user identifier information for identifying the user determined as a valid user by the user authenticating means.

In this case, it is preferred that:

the content marker transmitting means is configured to, for each of the extracted content marker information, acquire the viewing permission information stored in association with the user identifier information included in the accepted content marker output request and the content identifier information included in the content marker information, and transmit the content marker information and the acquired viewing permission information in association with each other to the user equipment having transmitted the content marker output request via the Core IMS part; and the user equipment includes a content marker list outputting means configured to receive the content marker information and the viewing permission information, and output content marker information associated with viewing permission information representing permission of transmission of the content data to the user equipment among the received content marker information, in a first mode, whereas output content marker information associated with viewing permission information representing non-permission of transmission of the content data to the user equipment among the received content marker information, in a second mode.

Further, it is preferred that in another aspect of the content delivery system:

the content marker transmitting means is configured to, for each of the extracted content marker information, acquire the viewing permission information stored in association with the user identifier information included in the accepted content marker output request and the content identifier information included in the content marker information, and transmit the content marker information and the acquired viewing permission information in association with each other to the user equipment having transmitted the content marker output request via the Core IMS part; and the user equipment includes a content marker list outputting means configured to receive the content marker information and the viewing permission information, and output content marker information associated with viewing permission information representing permission of transmission of the content data to the user equipment among the received content marker information, whereas not output content marker information associated with viewing permission information representing non-permission of transmission of the content data to the user equipment among the received content marker information.

Further, it is preferred that in another aspect of the content delivery system:

the content marker transmitting means is configured to, among the extracted content marker information, transmit content marker information that includes content identifier information stored in association with the user identifier information included in the accepted content marker output request and the viewing permission information representing permission of transmission of the content data to the user equipment, to the user equipment having transmitted the content marker output request via the Core IMS part; and the user equipment includes a content marker list outputting means configured to receive the content marker information and output the received content marker information.

Further, a content delivery method of another exemplary embodiment of the present invention includes:

accepting content marker information including content identifier information for identifying content;

executing a process of causing a storing device to store the accepted content marker information;

accepting sharing-user identifier information for identifying a user/users who shares/share the stored content marker information;

receiving a content marker output request, which is transmitted by user equipment, which includes user identifier information for identifying a user and which is a request for an output of content marker information, thereby accepting the content marker output request;

based on the user identifier information included in the accepted content marker output request and the accepted sharing-user identifier information, extracting content marker information corresponding to the user identifier information from the stored content marker information, and transmitting the extracted content marker information to the user equipment having transmitted the content marker output request;

in the case of receiving a content transmission request, which is transmitted by the user equipment and which includes the content identifier information included in the content marker information and user identifier information for identifying the user of the user equipment, transmitting content data representing content identified by the content identifier information to the user equipment;

causing the storing device to store the user identifier information, the content identifier information and viewing permission information representing whether to permit transmission of the content data to the user equipment in association with one another; and at the time of transmission of the content data to the user equipment, in a case that the viewing permission information stored in association with the user identifier information and the content identifier information that are included in the content transmission request represents non-permission of transmission of the content data to the user equipment, not transmitting the content data.

In this case, it is preferred that the content delivery method includes:

receiving equipment specification information transmitted by the user equipment and establishing a connection between an application server system and the user equipment based on the received equipment specification information, by a connection control system; and in a case that the connection between the user equipment and the application server system is established, transmitting the content data from the application server system to the user equipment.

In this case, it is preferred that the content delivery method includes:

receiving user authenticating information transmitted by the user equipment and inputted by the user of the user equipment, by the connection control system;

determining whether or not the received user authenticating information corresponds to previously stored user authenticating criterion information, thereby determining whether the user having inputted the user authenticating information is a valid user or not; and in a case that the user having inputted the user authenticating information is authenticated as a valid user, accepting the content marker output request including user identifier information for identifying the user.

In this case, it is preferred that the content delivery method includes:

at the time of transmission of the content marker information, for each of the extracted content marker information, acquiring the viewing permission information stored in association with the user identifier information included in the accepted content marker output request and the content identifier information included in the content marker information, and transmitting the content marker information and the acquired viewing permission information in association with each other to the user equipment having transmitted the content marker output request; and receiving the content marker information and the viewing permission information, and outputting content marker information associated with viewing permission information representing permission of transmission of the content data to the user equipment among the received content marker information, in a first mode, whereas outputting content marker information associated with viewing permission information representing non-permission of transmission of the content data to the user equipment among the received content marker information, in a second mode, by the user equipment.

Further, it is preferred that the content delivery method in another aspect includes:

at the time of transmission of the content marker information, for each of the extracted content marker information, acquiring the viewing permission information stored in association with the user identifier information included in the accepted content marker output request and the content identifier information included in the content marker information, and transmitting the content marker information and the acquired viewing permission information in association with each other to the user equipment having transmitted the content marker output request; and receiving the content marker information and the viewing permission information, and outputting content marker information associated with viewing permission information representing permission of transmission of the content data to the user equipment among the received content marker information, whereas not outputting content marker information associated with viewing permission information representing non-permission of transmission of the content data to the user equipment among the received content marker information, by the user equipment.

Further, it is preferred that the content delivery method in another aspect includes:

at the time of transmission of the content marker information, among the extracted content marker information, transmitting content marker information including content identifier information stored in association with the user identifier information included in the accepted content marker output request and the viewing permission information representing permission of transmission of the content data to the user equipment, to the user equipment having transmitted the content marker output request; and receiving the content marker information and outputting the received content marker information, by the user equipment.

Further, an application server system of another exemplary embodiment of the present invention includes:

a content marker information accepting means configured to accept content marker information including content identifier information for identifying content;

a content marker information storing processing means configured to execute a process of causing a storing device to store the accepted content marker information;

a sharing-user identifier information accepting means configured to accept sharing-user identifier information for identifying a user/users who shares/share the stored content marker information;

a content marker output request accepting means configured to receive a content marker output request, which is transmitted by user equipment, which includes user identifier information for identifying a user and which is a request for an output of the content marker information, thereby accepting the content marker output request;

a content marker transmitting means configured to, based on the user identifier information included in the accepted content marker output request and the accepted sharing-user identifier information, extract content marker information corresponding to the user identifier information from the stored content marker information, and transmit the extracted content marker information to the user equipment having transmitted the content marker output request;

a content transmitting means configured to, in the case of receiving a content transmission request that is transmitted by the user equipment and that includes the content identifier information included in the content marker information and the user identifier information for identifying the user of the user equipment, transmit content data representing content identified by the content identifier information to the user equipment;

a viewing permission information storing means configured to store the user identifier information, the content identifier information and viewing permission information representing whether to permit transmission of the content data to the user equipment in association with one another; and a content transmission prohibiting means configured to, in a case that the viewing permission information stored in association with the user identifier information and the content identifier information that are included in the content transmission request represents non-permission of transmission of the content data to the user equipment, prohibit transmission of the content data by the content transmitting means.

In this case, it is preferred that the content marker transmitting means is configured to, for each of the extracted content marker information, acquire the viewing permission information stored in association with the user identifier information included in the accepted content marker output request and the content identifier information included in the content marker information, and transmit the content marker information and the acquired viewing permission information in association with each other to the user equipment having transmitted the content marker output request.

Further, it is preferred that, in another aspect of the application server system, the content marker transmitting means is configured to, among the extracted content marker information, transmit content marker information including content identifier information stored in association with the user identifier information included in the accepted content marker output request and the viewing permission information representing permission of transmission of the content data to the user equipment, to the user equipment having transmitted the content marker output request.

Further, a computer program of another exemplary embodiment of the present invention is a computer program for causing an application server system to realize:

a content marker information accepting means configured to accept content marker information including content identifier information for identifying content;

a content marker information storing processing means configured to execute a process of causing a storing device to store the accepted content marker information;

a sharing-user identifier information accepting means configured to accept sharing-user identifier information for identifying a user/users who shares/share the stored content marker information;

a content marker output request accepting means configured to receive a content marker output request, which is transmitted by user equipment, which includes user identifier information for identifying a user and which is a request for an output of the content marker information, thereby accepting the content marker output request;

a content marker transmitting means configured to, based on the user identifier information included in the accepted content marker output request and the accepted sharing-user identifier information, extract content marker information corresponding to the user identifier information from the stored content marker information, and transmit the extracted content marker information to the user equipment having transmitted the content marker output request;

a content transmitting means configured to, in the case of receiving a content transmission request that is transmitted by the user equipment and that includes the content identifier information included in the content marker information and the user identifier information for identifying the user of the user equipment, transmit content data representing content identified by the content identifier information to the user equipment;

a viewing permission information storing processing means configured to cause the storing device to store the user identifier information, the content identifier information and viewing permission information representing whether to permit transmission of the content data to the user equipment in association with one another; and a content transmission prohibiting means configured to, in a case that the viewing permission information stored in association with the user identifier information and the content identifier information that are included in the content transmission request represents non-permission of transmission of the content data to the user equipment, prohibit transmission of the content data by the content transmitting means.

In this case, it is preferred that the content marker transmitting means is configured to, for each of the extracted content marker information, acquire the viewing permission information stored in association with the user identifier information included in the accepted content marker output request and the content identifier information included in the content marker information, and transmit the content marker information and the acquired viewing permission information in association with each other to the user equipment having transmitted the content marker output request.

Further, it is preferred that, in another aspect of the computer program, the content marker transmitting means is configured to, among the extracted content marker information, transmit content marker information including content identifier information stored in association with the user identifier information included in the accepted content marker output request and the viewing permission information representing permission of transmission of the content data to the user equipment, to the user equipment having transmitted the content marker output request.

Further, user equipment of another exemplary embodiment of the present invention includes:

a content marker information transmitting means configured to transmit content marker information including content identifier information for identifying content;

a sharing-user identifier information transmitting means configured to transmit sharing-user identifier information for identifying a user/users who shares/share the content marker information;

a content marker output request transmitting means configured to transmit a content marker output request that includes user identifier information for identifying a user and that is a request for an output of content marker information;

a content marker list outputting means configured to receive the content marker information and output the received content marker information;

a content marker specification information accepting means configured to, from among the outputted content marker information, accept content marker specification information for specifying content marker information selected by the user;

a content transmission request transmitting means configured to transmit a content transmission request including content identifier information included in content marker information specified by the accepted content marker specification information; and a content outputting means configured to receive content data and output content represented by the received content data.

In this case, it is preferred that the content marker list outputting means is configured to receive the content marker information and viewing permission information representing whether to permit transmission of content data to the user equipment, and output content marker information associated with viewing permission information representing permission of transmission of the content data to the user equipment among the received content marker information, in a first mode, whereas output content marker information associated with viewing permission information representing non-permission of transmission of the content data to the user equipment among the received content marker information, in a second mode.

Further, it is preferred that, in another aspect of the user equipment, the content marker list outputting means is configured to receive the content marker information and viewing permission information representing whether to permit transmission of content data to the user equipment, and output content marker information associated with viewing permission information representing permission of transmission of the content data to the user equipment among the received content marker information, whereas not output content marker information associated with viewing permission information representing non-permission of transmission of the content data to the user equipment among the received content marker information.

Further, a computer program of another exemplary embodiment of the present invention is a computer program for causing user equipment to realize:

a content marker information transmitting means configured to transmit content marker information including content identifier information for identifying content;

a sharing-user identifier information transmitting means configured to transmit sharing-user identifier information for identifying a user/users who shares/share the content marker information;

a content marker output request transmitting means configured to transmit a content marker output request that includes user identifier information for identifying a user of the user equipment and that is a request for an output of content marker information;

a content marker list outputting means configured to receive the content marker information and output the received content marker information;

a content marker specification information accepting means configured to, from among the outputted content marker information, accept content marker specification information for specifying content marker information selected by the user;

a content transmission request transmitting means configured to transmit a content transmission request including content identifier information included in content marker information specified by the accepted content marker specification information; and a content outputting means configured to receive content data and output content represented by the received content data.

In this case, it is preferred that the content marker list outputting means is configured to receive the content marker information and viewing permission information representing whether to permit transmission of content data to the user equipment, and output content marker information associated with viewing permission information representing permission of transmission of the content data to the user equipment among the received content marker information, in a first mode, whereas output content marker information associated with viewing permission information representing non-permission of transmission of the content data to the user equipment among the received content marker information, in a second mode.

Further, it is preferred that, in another aspect of the computer program, the content marker list outputting means is configured to receive the content marker information and viewing permission information representing whether to permit transmission of content data to the user equipment, and output content marker information associated with viewing permission information representing permission of transmission of the content data to the user equipment among the received content marker information, whereas not output content marker information associated with viewing permission information representing non-permission of transmission of the content data to the user equipment among the received content marker information.

Inventions of the content delivery method, the application server system, the user equipment and the computer program having the aforementioned configurations also have like actions as the invention of the abovementioned content delivery system, and therefore, can achieve the object of the present invention mentioned above.

Although the present invention has been described with reference to the respective embodiments described above, the present invention is not limited to the aforementioned embodiments. The configurations and details of the present invention can be altered in various manners that can be understood by those skilled in the art within the scope of the present invention. For example, as other modified examples of the respective exemplary embodiments, any combination of the aforementioned exemplary embodiments and modified examples may be employed.

Further, in the modified examples of the respective embodiments, content marker registration information may include registering user identifier information for identifying a user having registered content marker information. In this case, it is preferred that the user equipment 2a and 2b are configured to, when displaying a list of content marker information, also display registering user identifier information for identifying a user having registered each content marker information.

Further, each of the modified examples of the respective embodiments may be provided with, instead of the service control server 4a and the media server 4b, a server having both the functions of the service control server 4a and the media server 4b.

Further, although the media server 4b has all of the media functions part 60 in the respective exemplary embodiments, a first server may have part (a media control functions part) of the media functions part 60 and a second server may have the rest (a media delivery functions part) of the media functions part 60.

Furthermore, in the modified examples of the respective embodiments, the application server system 4 may include the portal server 5. Moreover, the service control server 4a or the media server 4b may have the function of the portal server 5.

Further, each of the modified examples of the respective embodiments may be provided with a plurality of servers each having the media delivery functions part of the media functions part 60.

Further, in the modified examples of the respective embodiments, the connection control system 3 includes a plurality of connection control servers (the connection control servers 3a, 3b, etc.), but may include only one connection control server.

In the respective embodiments, each of the user equipment 2a and 2b is a set top box, but may be a mobile phone, a PDA (Personal Data Assistance), a smartphone, a PHS (Personal Handyphone System), a game machine, a car navigation device, a personal computer, or the like.

Moreover, in the respective embodiments, content is a moving image, but may by only an image or only sound.

A content marker table, sharing-user identifier information, sharing-permitted-user identifier information, a sharing-user table and/or a viewing authority table in the respective embodiments may be stored as information to be deleted (Action Data) in a case that a predetermined condition is satisfied (e.g., in a case that a preset time has elapsed, or in a case that content has become more than a preset capacity), or may be stored as information to be edited (added, changed, or deleted) (User Profile) only in accordance with an instruction by a controller or a user of the content delivery system 1.

Further, in the respective embodiments, the components of the content delivery system 1 are expressed as components that compose an IMS (IP Multimedia Subsystem), but may be expressed as components that compose an MMS (Multimedia Messaging Service).

Further, in a case that the content delivery system 1 is applied to a VoD system, content marker information may be referred to as "Available CoD." Moreover, in a case that the content delivery system 1 is applied to a BC system, content marker information may be referred to as "BC Content markers." Additionally, in a case that the content delivery system 1 is applied to an nPVR system, content marker information may be referred to as "N-PVR items."

Further, a program is stored in a storing device in the respective exemplary embodiments, but may be stored in a computer-readable recording medium. For example, the recording medium is a portable medium such as a flexible disk, an optical disk, a magneto-optical disk, and a semiconductor memory.

Each of the functions of the content delivery system 1 in the respective exemplary embodiments is realized by execution of a program (software) by the CPU, but may be realized by hardware such as a circuit.

The present invention is based upon and claims the benefit of priority from Japanese patent application No. 2008-294271, filed on Nov. 18, 2008, the disclosure of which is incorporated herein in its entirety by reference.

The present invention can be applied to a video-on-demand system that delivers content via an IP network, an IPTV system that gives a TV broadcast via an IP network, and the like.

The invention claimed is:

1. A content delivery system having a CPU comprising:
   a content marker information accepting processor configured to accept content marker information including content identifier information for identifying content;
   a content marker information storing processor configured to execute a process of causing a storing device to store the accepted content marker information;
   a sharing-user identifier information accepting processor configured to accept sharing-user identifier information for identifying a user/users who shares/share the stored content marker information;
   a content marker output request accepting processor configured to receive a content marker output request that is transmitted by user equipment, that includes user identifier information for identifying a user and that is a request for an output of the content marker information, thereby accepting the content marker output request;
   a content marker transmitting processor configured to, based on the user identifier information included in the accepted content marker output request and the accepted sharing-user identifier information, extract content marker information corresponding to the user identifier information from the stored content marker information, and transmit the extracted content marker information to the user equipment having transmitted the content marker output request;
   a content transmitting processor configured to, in the case of receiving the content transmission request that is transmitted by the user equipment and that includes the content identifier information included in the content marker information and the user identifier information for identifying the user of the user equipment, transmit content data representing content identified by the content identifier information to the user equipment;
   a viewing permission information storing processor configured to store the user identifier information, the content identifier information and viewing permission information representing whether to permit transmission of the content data to the user equipment in association with one another; and
   a content transmission prohibiting processor configured to, in a case that the viewing permission information stored in association with the user identifier information and the content identifier information that are included in the content transmission request represents non-permission of transmission of the content data to the user equipment, prohibit transmission of the content data by the content transmitting processor, wherein
   the content marker transmitting processor is configured to, for each of the extracted content marker information, acquire the viewing permission information stored in association with the user identifier information included in the accepted content marker output request and the content identifier information included in the content marker information, and transmit the content marker information and the acquired viewing permission information in association with each other to the user equipment having transmitted the content marker output request; and the user equipment includes a content marker list outputting processor configured to receive the content marker information and the viewing permission information, and output content marker information associated with viewing permission information representing permission of transmission of the content data to the user equipment among the received content marker information, whereas not output content marker information associated with viewing permission information representing non-permission of transmission of the content data to the user equipment among the received content marker information.

2. The content delivery system according to claim 1, further comprising an application server system and a connection control system, wherein:

the connection control system is configured to receive equipment specification information transmitted by the user equipment, and establish a connection between the application server system and the user equipment based on the received equipment specification information; and the content transmitting processor is configured to transmit the content data to the user equipment in a case that the connection between the user equipment and the application server system is established by the connection control system.

3. The content delivery system according to claim 1, wherein:

the connection control system is configured to receive user authenticating information transmitted by the user equipment and inputted by the user of the user equipment, the content delivery system executes comprises:
    a user authenticating criterion information storing processor configured to previously store user authenticating criterion information; and
    a user authenticating processor configured to determine whether or not the user authenticating information received by the connection control system corresponds to the user authenticating criterion information stored by the user authenticating criterion information storing processor, thereby determining whether the user having inputted the user authenticating information is a valid user or not, wherein:

the content marker output request accepting processor is configured to accept the content marker output request including user identifier information for identifying the user determined as a valid user by the user authenticating processor.

4. The content delivery system according to claim 1, comprising a sharing-user identifier information storing processor configured to execute a process of causing the storing device to store the accepted sharing-user identifier information and user identifier information for identifying a user of user equipment having transmitted the sharing-user identifier information in association with each other, wherein:

the content marker information accepting processor is configured to accept a content marker registration request that includes sharing permission information representing whether to permit sharing of content marker information with another user, the content marker information, and user identifier information for identifying a user of user equipment having transmitted the content marker information;

the content marker information storing processor is configured to execute the process of causing the storing device to store the content marker information and the user identifier information that are included in the accepted content marker registration request in association with each other and, in a case that the sharing permission information included in the content marker registration request represents permission of sharing of content marker information with another user, further causing the storing device to store user identifier information identical to sharing user identifier information stored in association with the user identifier information included in the accepted content marker registration request and the content marker information in association with each other; and the content marker transmitting processor is configured to extract content marker information stored in association with user identifier information identical to the user identifier information included in the accepted content marker output request.

5. The content delivery system according to claim 1, wherein the CPU further comprises a content marker registration request accepting processor, which is a processor composing the content marker information accepting processor and the sharing-user identifier information accepting processor and which is a processor configured to accept a content marker registration request including content marker information, user identifier information for identifying a user of user equipment having transmitted the content marker information and the sharing-user identifier information, wherein:

the content marker information storing processor is configured to execute the process of causing the storing device to store the content marker information, the user identifier information and the sharing-user identifier information that are included in the accepted content marker registration request in association with one another; and the content marker transmitting processor is configured to extract content marker information stored in association with user identifier information or sharing-user identifier information that is identical to the user identifier information included in the accepted content marker output request.

6. The content delivery system according to claim 1, wherein the CPU further comprises a sharing-user identifier information storing processor configured to execute a process of causing the storing device to store the accepted sharing-user identifier information and user identifier information for identifying a user of user equipment having transmitted the sharing-user identifier information in association with each other, wherein:

the content marker information accepting processor is configured to accept a content marker registration request that includes sharing permission information representing whether to permit sharing of content marker information with another user, the content marker information, and user identifier information for identifying a user of user equipment having transmitted the content marker information;

the content marker information storing processor is configured to execute the process of, in a case that the sharing permission information included in the accepted content marker registration request represents non-permission of sharing of content marker information with another user, causing the storing device to store the content marker information and the user identifier information that are included in the content marker registration request in association with each other, whereas, in a case that the sharing permission information represents permission of sharing of content marker information with another user, causing the storing device to store the content marker information and the user identifier information that are included in the content marker registration request, and sharing-user identifier information stored in association with the user identifier information, in association with each other; and the content marker transmitting processor is configured to extract content marker information stored in association with user identifier information or sharing-user identifier information that is identical to the user identifier information included in the accepted content marker output request.

7. A content delivery system, comprising an application server system and a connection control system, wherein:

the connection control system comprises a Core IMS (Internet Protocol Multimedia Subsystem) processor configured to receive equipment specification information transmitted by user equipment and establish a connection between the application server system and the user equipment based on the received equipment specification information;

the application server system comprising:
  a media functions processor configured to transmit content data representing content to the user equipment with the connection established by the connection control system;
  a service control functions processor configured to control a service provided by the media functions processor; and
  a user profile server functions processor configured to store profile information of a user of the user equipment; and the application server system further comprising:
  a content marker information accepting processor configured to receive content marker information, which is information transmitted by the user equipment and which is information including content identifier information for identifying content, via the Core IMS processor, thereby accepting the content marker information;
  a content marker information storing processor configured to execute a process of causing the user profile server functions processor or the service control functions processor to store the accepted content marker information;
  a sharing-user identifier information accepting processor configured to receive sharing-user identifier information, which is information transmitted by the user equipment and which is information for identifying a user/users who shares/share the stored content marker information, via the Core IMS processor, thereby accepting the sharing-user identifier information;
  a content marker output request accepting processor configured to receive a content marker output request, which is information transmitted by the user equipment and which is information including user identifier information for identifying a user and requesting for an output of content marker information, via the Core IMS processor, thereby accepting the content marker output request;
  a content marker transmitting processor configured to, based on the user identifier information included in the accepted content marker output request and the accepted sharing-user identifier information, extract content marker information corresponding to the user identifier information from the stored content marker information, and transmit the extracted content marker information to the user equipment having transmitted the content marker output request via the Core IMS processor;
  a content transmitting processor configured to, in the case of receiving a content transmission request, which is transmitted by the user equipment and which includes the content identifier information included in the content marker information and user identifier information for identifying a user of the user equipment, transmit content data representing content identified by the content identifier information to the user equipment;
  a viewing permission information storing processor configured to store the user identifier information, the content identifier information and viewing permission information representing whether to permit transmission of the content data to the user equipment in association with one another; and
  a content transmission prohibiting processor configured to, in a case that the viewing permission information stored in association with the user identifier information and the content identifier information that are included in the content transmission request represents non-permission of transmission of the content data to the user equipment, prohibit transmission of the content data by the content transmitting processor, wherein the content marker transmitting processor is configured to, for each of the extracted content marker information, acquire the viewing permission information stored in association with the user identifier information included in the accepted content marker output request and the content identifier information included in the content marker information, and transmit the content marker information and the acquired viewing permission information in association with each other to the user equipment having transmitted the content marker output request via the Core IMS processor; and the user equipment includes a content marker list outputting processor configured to receive the content marker information and the viewing permission information, and output content marker information associated with viewing permission information representing permission of transmission of the content data to the user equipment among the received content marker information, whereas not output content marker information associated with viewing permission information representing non-permission of transmission of the content data to the user equipment among the received content marker information.

8. The content delivery system according to claim 7, wherein:

the Core IMS processor is configured to receive user authenticating information transmitted by the user equipment and inputted by the user of the user equipment;

the Core IMS processor or the user profile server functions processor has a user authenticating criterion information storing processor configured to previously store user authenticating criterion information;

the Core IMS processor or the service control functions processor has a user authenticating processor configured to determine whether or not the user authenticating information received by the connection control system corresponds to the user authenticating criterion information stored by the user authenticating criterion information storing processor, thereby determining whether the user having inputted the user authenticating information is a valid user or not; and the content marker output request accepting processor is configured to accept the content marker output request including user identifier information for identifying the user determined as a valid user by the user authenticating processor.

9. A content delivery method, comprising:

accepting content marker information including content identifier information for identifying content;

executing a process of causing a storing device to store the accepted content marker information;

accepting sharing-user identifier information for identifying a user/users who shares/share the stored content marker information;

receiving a content marker output request, which is transmitted by user equipment, which includes user identifier information for identifying a user and which is a request for an output of content marker information, thereby accepting the content marker output request;

based on the user identifier information included in the accepted content marker output request and the accepted sharing-user identifier information, extracting content marker information corresponding to the user identifier information from the stored content marker information, and transmitting the extracted content marker information to the user equipment having transmitted the content marker output request;

in the case of receiving a content transmission request, which is transmitted by the user equipment and which includes the content identifier information included in the content marker information and user identifier information for identifying the user of the user equipment, transmitting content data representing content identified by the content identifier information to the user equipment;

causing the storing device to store the user identifier information, the content identifier information and viewing permission information representing whether to permit transmission of the content data to the user equipment in association with one another; and at the time of transmission of the content data to the user equipment, in a case that the viewing permission information stored in association with the user identifier information and the content identifier information that are included in the content transmission request represents non-permission of transmission of the content data to the user equipment, not transmitting the content data, wherein at the time of transmission of the content marker information, for each of the extracted content marker information, acquiring the viewing permission information stored in association with the user identifier information included in the accepted content marker output request and the content identifier information included in the content marker information, and transmitting the content marker information and the acquired viewing permission information in association with each other to the user equipment having transmitted the content marker output request; and receiving the content marker information and the viewing permission information, and outputting content marker information associated with viewing permission information representing permission of transmission of the content data to the user equipment among the received content marker information, whereas not outputting content marker information associated with viewing permission information representing non-permission of transmission of the content data to the user equipment among the received content marker information, by the user equipment.

10. The content delivery method according to claim 9, comprising:

receiving equipment specification information transmitted by the user equipment and establishing a connection between an application server system and the user equipment based on the received equipment specification information, by a connection control system; and in a case that the connection between the user equipment and the application server system is established, transmitting the content data from the application server system to the user equipment.

11. The content delivery method according to claim 9, comprising:

receiving user authenticating information transmitted by the user equipment and inputted by the user of the user equipment, by the connection control system;

determining whether or not the received user authenticating information corresponds to previously stored user authenticating criterion information, thereby determining whether the user having inputted the user authenticating information is a valid user or not; and in a case that the user having inputted the user authenticating information is determined as a valid user, accepting the content marker output request including user identifier information for identifying the user.

12. An application server system having a CPU comprising:

a content marker information accepting processor configured to accept content marker information including content identifier information for identifying content;

a content marker information storing processor configured to execute a process of causing a storing device to store the accepted content marker information;

a sharing-user identifier information accepting processor configured to accept sharing-user identifier information for identifying a user/users who shares/share the stored content marker information;

a content marker output request accepting processor configured to receive a content marker output request, which is transmitted by user equipment, which includes user identifier information for identifying a user and which is a request for an output of the content marker information, thereby accepting the content marker output request;

a content marker transmitting processor configured to, based on the user identifier information included in the accepted content marker output request and the accepted sharing-user identifier information, extract content marker information corresponding to the user identifier information from the stored content marker information, and transmit the extracted content marker information to the user equipment having transmitted the content marker output request;

a content transmitting processor configured to, in the case of receiving a content transmission request that is transmitted by the user equipment and that includes the content identifier information included in the content marker information and the user identifier information for identifying the user of the user equipment, transmit content data representing content identified by the content identifier information to the user equipment;

a viewing permission information storing processor configured to store the user identifier information, the content identifier information and viewing permission information representing whether to permit transmission of the content data to the user equipment in association with one another; and a content transmission prohibiting processor configured to, in a case that the viewing permission information stored in association with the user identifier information and the content identifier information that are included in the content transmission request represents non-permission of transmission of the content data to the user equipment, prohibit transmission of the content data by the content transmitting processor, wherein the content marker transmitting processor is configured to, for each of the extracted content marker information, acquire the viewing permission information stored in association with the user identifier information included in the accepted content marker output request and the content identifier information included in the content marker information, and transmit the content marker information and the acquired viewing permission information in association with each other to the user equipment having transmitted the content marker output request via the Core IMS processor; and the user equipment includes a content marker list outputting processor configured to receive the content marker information and the viewing permission information, and output content marker information associated with viewing permission information representing permission of transmission of the content data to the user equipment among the received content marker information, whereas not output content marker information associated with viewing permission information representing non-permission of transmission of the content data to the user equipment among the received content marker information.

13. A non-transitory computer-readable medium storing a program for causing an application server system to execute processing comprising:

a content marker information accepting processing configured to accept content marker information including content identifier information for identifying content;

a content marker information storing processing configured to execute a process of causing a storing device to store the accepted content marker information;

a sharing-user identifier information accepting processing configured to accept sharing-user identifier information for identifying a user/users who shares/share the stored content marker information;

a content marker output request accepting processing configured to receive a content marker output request, which is transmitted by user equipment, which includes user identifier information for identifying a user and which is a request for an output of the content marker information, thereby accepting the content marker output request;

a content marker transmitting processing configured to, based on the user identifier information included in the accepted content marker output request and the accepted sharing-user identifier information, extract content marker information corresponding to the user identifier information from the stored content marker information, and transmit the extracted content marker information to the user equipment having transmitted the content marker output request;

a content transmitting processing configured to, in the case of receiving a content transmission request that is transmitted by the user equipment and that includes the content identifier information included in the content marker information and the user identifier information for identifying the user of the user equipment, transmit content data representing content identified by the content identifier information to the user equipment;

a viewing permission information storing processing configured to cause the storing device to store the user identifier information, the content identifier information and viewing permission information representing whether to permit transmission of the content data to the user equipment in association with one another; and a content transmission prohibiting processing configured to, in a case that the viewing permission information stored in association with the user identifier information and the content identifier information that are included in the content transmission request represents non-permission of transmission of the content data to the user equipment, prohibit transmission of the content data by the content transmitting processing, wherein the content marker transmitting processor is configured to, for each of the extracted content marker information, acquire the viewing permission information stored in association with the user identifier information included in the accepted content marker output request and the content identifier information included in the content marker information, and transmit the content marker information and the acquired viewing permission information in association with each other to the user equipment having transmitted the content marker output request via the Core IMS processor; and the user equipment includes a content marker list outputting processor configured to receive the content marker information and the viewing permission information, and output content marker information associated with viewing permission information representing permission of transmission of the content data to the user equipment among the received content marker information, whereas not output content marker information associated with viewing permission information representing non-permission of transmission of the content data to the user equipment among the received content marker information.

14. User equipment having a CPU comprising:

a content marker information transmitting processor configured to transmit content marker information including content identifier information for identifying content;

a sharing-user identifier information transmitting processor configured to transmit sharing-user identifier information for identifying a user/users who shares/share the content marker information;

a content marker output request transmitting processor configured to transmit a content marker output request that includes user identifier information for identifying a user and that is a request for an output of content marker information;

a content marker list outputting processor configured to receive the content marker information and output the received content marker information;
a content marker specification information accepting processor configured to, from among the outputted content marker information, accept content marker specification information for specifying content marker information selected by the user;
a content transmission request transmitting processor configured to transmit a content transmission request including content identifier information included in content marker information specified by the accepted content marker specification information; and
a content outputting processor configured to receive content data and output content represented by the received content data, wherein
the content marker list outputting processor is configured to receive the content marker information and viewing permission information representing whether to permit transmission of content data to the user equipment, and output content marker information associated with viewing permission information representing permission of transmission of the content data to the user equipment among the received content marker information, whereas not output content marker information associated with viewing permission information representing non-permission of transmission of the content data to the user equipment among the received content marker information.

15. A non-transitory computer-readable medium storing a program for causing user equipment to execute processing comprising:
a content marker information transmitting processing configured to transmit content marker information including content identifier information for identifying content;
a sharing-user identifier information transmitting processing configured to transmit sharing-user identifier information for identifying a user/users who shares/share the content marker information;
a content marker output request transmitting processing configured to transmit a content marker output request that includes user identifier information for identifying a user of the user equipment and that is a request for an output of content marker information;
a content marker list outputting processing configured to receive the content marker information and output the received content marker information;
a content marker specification information accepting processing configured to, from among the outputted content marker information, accept content marker specification information for specifying content marker information selected by the user;
a content transmission request transmitting processing configured to transmit a content transmission request including content identifier information included in content marker information specified by the accepted content marker specification information;
and
a content outputting processing configured to receive content data and output content represented by the received content data, wherein
the content marker list outputting processing is configured to receive the content marker information and viewing permission information representing whether to permit transmission of content data to the user equipment, and output content marker information associated with viewing permission information representing permission of transmission of the content data to the user equipment among the received content marker information, whereas not output content marker information associated with viewing permission information representing non-permission of transmission of the content data to the user equipment among the received content marker information.

\* \* \* \* \*